US011836908B2

(12) United States Patent
Weinstein et al.

(10) Patent No.: US 11,836,908 B2
(45) Date of Patent: Dec. 5, 2023

(54) METHOD AND SYSTEM FOR DETERMINING PACKAGE INTEGRITY

(71) Applicant: YORAN IMAGING LTD., Timrat (IL)

(72) Inventors: Yoav Weinstein, Atlit (IL); Eran Sinbar, Misgav (IL)

(73) Assignee: YORAN IMAGING LTD., Timrat (IL)

( * ) Notice: Subject to any disclaimer, the term of this patent is extended or adjusted under 35 U.S.C. 154(b) by 151 days.

(21) Appl. No.: 17/556,072

(22) Filed: Dec. 20, 2021

(65) Prior Publication Data

US 2022/0114720 A1 Apr. 14, 2022

Related U.S. Application Data

(63) Continuation-in-part of application No. 16/485,533, filed as application No. PCT/IL2018/050114 on Feb. 1, 2018, now Pat. No. 11,237,118.

(60) Provisional application No. 62/461,026, filed on Feb. 20, 2017.

(51) Int. Cl.
*H04N 7/18* (2006.01)
*G06T 7/00* (2017.01)
*G06V 10/44* (2022.01)

(52) U.S. Cl.
CPC ............ *G06T 7/0004* (2013.01); *G06V 10/44* (2022.01); *G06T 2207/30128* (2013.01)

(58) Field of Classification Search
CPC ....... G01N 21/3563; G01N 2021/8887; G01N 21/71; G01N 21/8851; G01N 21/90; B29C 65/18; B29C 66/1122; B29C 66/7373; B29C 66/73921; B29C 2793/009; B29C 2795/002
USPC .......................................................... 348/92
See application file for complete search history.

(56) References Cited

U.S. PATENT DOCUMENTS

| 5,029,463 | A | 7/1991 | Schvester et al. |
| 5,150,605 | A | 9/1992 | Simpson |
| 7,434,372 | B2 | 10/2008 | Vanhamel et al. |
| 7,565,828 | B2 | 7/2009 | Barcan |
| 8,831,764 | B2 | 9/2014 | Gates et al. |
| 2002/0166983 | A1 | 11/2002 | Katzir et al. |
| 2005/0111726 | A1 | 5/2005 | Hackney et al. |

(Continued)

FOREIGN PATENT DOCUMENTS

| CA | 3032888 A1 | 2/2018 |
| DE | 102014216576 A1 | 2/2016 |

(Continued)

OTHER PUBLICATIONS

International Search Report PCT/I L2018/050114; Completed May 17, 2018; dated May 17, 2018; 3 pages.
Written Opinion of the International Searching Authority PCT/I L2018/050114; dated May 17, 2018 ; 1 pages.

*Primary Examiner* — Masum Billah
(74) *Attorney, Agent, or Firm* — The Roy Gross Law Firm, LLC; Roy Gross

(57) ABSTRACT

Methods and systems for detecting and monitoring defects in a sealing region of a container, including imaging at least part of the sealing region of the container using a camera operative at a wavelength in the range of 0.76 μm-14 μm; during and/or after the filling of the container with a filling material and prior to sealing of the container being completed; and identifying, based on at least one frame obtained from the imaging, defects in the sealing region.

20 Claims, 11 Drawing Sheets

(56) References Cited

U.S. PATENT DOCUMENTS

| | | | |
|---|---|---|---|
| 2005/0286606 A1* | 12/2005 | Ignatowicz | B29C 65/8261 |
| | | | 374/45 |
| 2009/0159798 A1* | 6/2009 | Weida | G01M 3/202 |
| | | | 250/330 |
| 2010/0018941 A1* | 1/2010 | Kerr | G01M 3/38 |
| | | | 215/250 |
| 2013/0278635 A1 | 10/2013 | Maggiore | |
| 2013/0286213 A1 | 10/2013 | Cetin et al. | |
| 2016/0054245 A1* | 2/2016 | Weinstein | B29C 65/8261 |
| | | | 250/339.14 |
| 2016/0238373 A1 | 8/2016 | Featherstone | |
| 2018/0036144 A1* | 2/2018 | Radspieler | A61F 2/5046 |

FOREIGN PATENT DOCUMENTS

| | | | |
|---|---|---|---|
| EP | 0355699 | A2 | 2/1990 |
| EP | 3588065 | A1 | 1/2020 |
| JP | S6228650 | A | 2/1987 |
| JP | 2006038751 | A | 2/2006 |
| JP | 2006-090901 | A | 4/2006 |
| JP | 2007-017283 | A | 1/2007 |
| JP | 2009184724 | A | 8/2009 |
| JP | 2010-272797 | A | 12/2010 |
| JP | 2014-530152 | A | 11/2014 |
| JP | 6229193 | B1 | 11/2017 |
| NO | 2018150415 | A1 | 8/2018 |
| WO | 2014195943 | A1 | 12/2014 |
| WO | 2015140797 | A2 | 9/2015 |

* cited by examiner

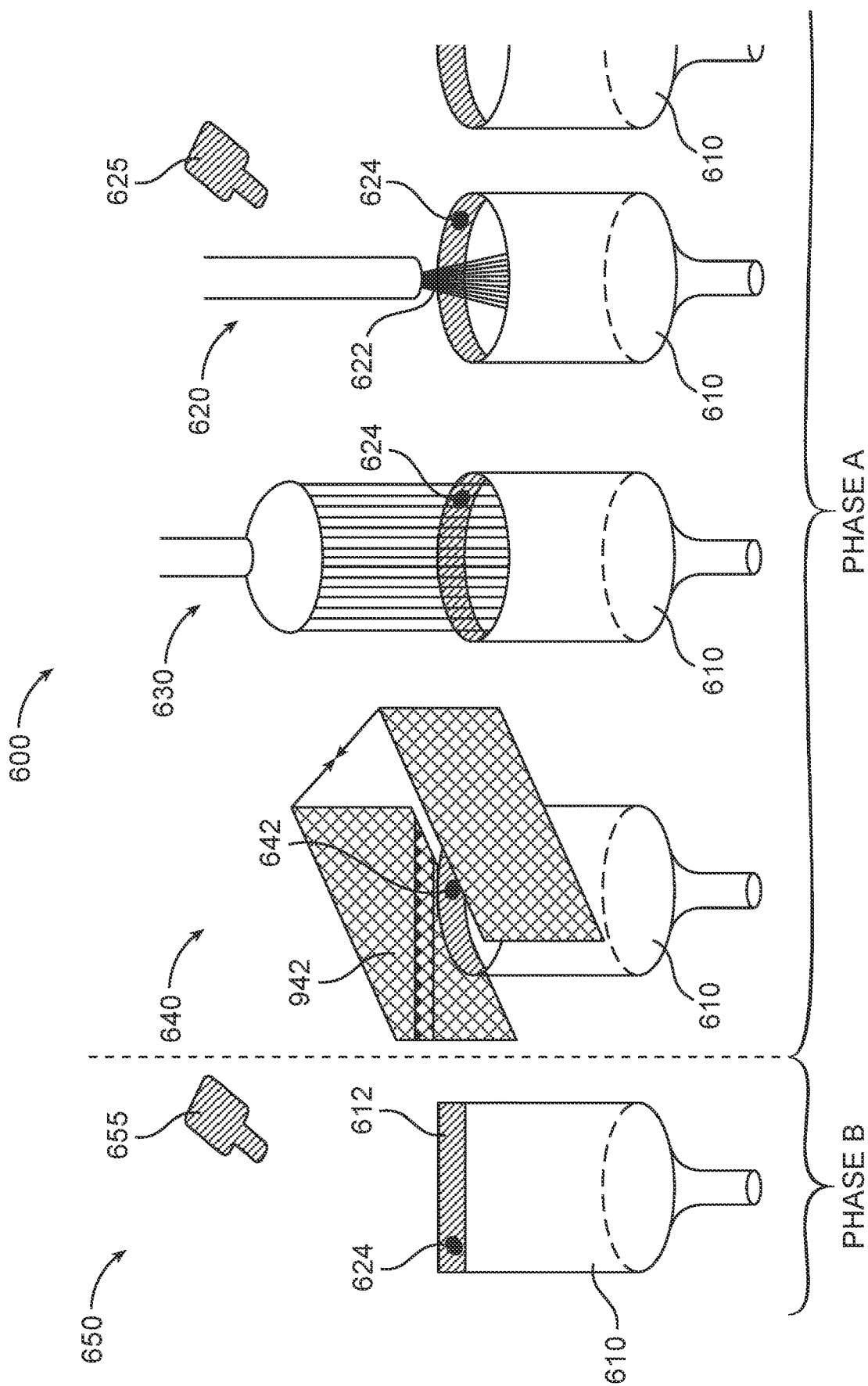

METHOD AND SYSTEM FOR DETERMINING PACKAGE INTEGRITY

CROSS REFERENCE TO RELATED APPLICATIONS

This application is Continuation in Part of U.S. patent application Ser. No. 16/485,533 filed on Aug. 13, 2019, which is a National Phase of PCT Patent Application No. PCT/IL2018/050114 having International filing date of Feb. 1, 2018, which claims the benefit of priority of U.S. Provisional Application No. 62/461,026 filed on Feb. 20, 2017. The contents of the above applications are all incorporated by reference as if fully set forth herein in their entirety.

FIELD OF THE INVENTION

This invention relates to a methods and systems for determining package integrity, based on imaging of the package filling.

BACKGROUND OF THE INVENTION

The integrity of a packaged product is critical for maintaining product quality until it reaches the end user. Defects in hermeticity of a package may cause contamination, introduction of moisture etc., which may result in loss of quality and even pose a safety hazard. It is therefore important to ensure the integrity of the packaged products at least at the end of their production process.

Currently, there are various techniques to verify the integrity of a produced package. Most typically the evaluation is based on sporadic testing by physical examination.

U.S. Pat. No. 5,029,463 et al. describes a leak detection device for in-line measurement of package integrity.

U.S. Pat. No. 5,150,605 describes a method for determining proper sealing of a hermetically sealed package.

U.S. Pat. No. 7,434,372 et al. describes a package integrity test comprising, inter alia, pressurizing the package with a gas and monitoring pressure to determine package integrity.

U.S. Pat. No. 7,565,828 describes apparatus and methods for testing package integrity and/or seal strength.

EP 0 355 699 describes a method for inspecting leakage of a sealed container. The method comprises changing an internal pressure of a vacuum chamber provided therein with an eddy-current displacement sensor to a predetermined degree of vacuum from a normal pressure after putting a sealed container having a conductive material at least at a portion to be inspected in the chamber; detecting an amount of expansion of the sealed container at the degree of vacuum in time sequence by the eddy-current displacement sensor; and determining any aging change in the amount of expansion after a time when the detected amount of expansion shows the maximum value, thereby to find out any pin hole formed in the sealed container.

WO 2014/195943 describes a method and system for determining integrity of a product. The method comprises; (a) placing the product between at least one radiation emitting body and one infra-red sensing arrangement comprising at least one IR sensor, the product comprises a housing being essentially transparent to IR radiation; (b) while the product is at a steady state temperature which is different from the temperature of the radiation emitting body, creating a sensing session comprising sensing by the at least one IR sensor, radiation emitted from the radiation emitting body, at least a portion of the emitted radiation being transmitted through the housing of the product, and (c) generating IR data from the sensed radiation, the IR data being indicative of the integrity of the product; wherein the product is spaced apart from at least the radiation emitting body such that no contact exists there between.

SUMMARY OF THE INVENTION

The present invention provides utilizing thermal imaging for determining package integrity of packed products to assure proper sealing of the package while the thermal image is being taken:
1. Phase A: during or after filling of the package (but prior to sealing phase completion).
2. Phase B: after sealing phase completion.
3. During both, phase A and phase B Complete and lasting sealing is a critical stage of most packaging processes, and sealing integrity needs to be inspected/tested in order to avoid messy leaks, costly product returns, damage to the product itself and/or damage to brand reputation. Packaging lines typically run at a fast pace, making traditional leak testing methods, such as a vacuum or pressure decay testing, or squeezing too slowly, too expensive, and impractical. Moreover, these leak testing methods are based on statistical sampling and typically enable monitoring the sealing process itself (i.e. temperature applied), but most often these tests are incapable of detecting improper sealing caused by defects such as contamination of the sealing region by package content during filling of the package.

Thermal imaging (also known by the term "thermographic imaging") is a type of infrared (IR) imaging in which radiation emitted from a substance is detected based on the temperature and emissivity at one or more locations across the substance (according to Black Body radiation law), and IR images are produced according to the detected temperatures and emissivity. Typically, the amount of radiation emitted by a substance increases with temperature. Therefore, thermography allows detecting variations in temperature and/or emissivity of a substance. For example, when viewed by a thermographic camera, warm objects can be differentiated from cooler backgrounds. Similarly, because of differences in emissivity, liquid-based materials (including liquids, creams, pastes, foams, etc.) can be differentiated from dry products (e.g. the packaging material) using thermal imaging.

The inventors of the present invention have surprisingly found that defects in the sealing of packages can be detected by thermal imaging at the filling phase, i.e. before the heat sealing of the package. This is particularly advantageous for packages made of materials having a thermal imaging signature, which is not sensitive enough to identify contamination or other defects of the sealing region, when heated.

This problem is common to most heat-sealed products, in particular tubes, such as tubes used for packaging of cosmetics, toothpaste, pharmaceuticals, food, and the like. This is because sealing is performed on two thick layers of material (e.g. plastic, plastic-aluminum, aluminum, and the like), having a high heat capacity, which make identifying changes in heat capacity due to contamination or other defects in the sealing region difficult.

Moreover, since the material filling the tubes is typically in a liquid, paste or cream form, it tends to splash during the filling phase and contaminate the sealing region. These splashes are for the most part clear, colorless, or having a similar color as its container, making it a hard task for standard visual imaging.

Surprisingly, it was found by the inventors of the present application, that such non-solid materials (e.g. liquid, paste, foams or creams), have a different emissivity and thermal signature than their surrounding container, thus enabling reliable detection via thermal imaging. This is because of the increase in signal contrast and decrease in reflection noise, as compared to standard visual imaging.

Accordingly, there is provided herein a system and method for identification of improper sealing, by monitoring the sealing region by imaging during the filling phase of the packaging process. According to some embodiments, the imaging is thermal imaging performed in a wavelength range of 3 µm-14 µm, preferably in a wavelength range of 8 µm-14 µm. According to some embodiments, the method identification of defects in or on the sealing region prior to completion of the sealing packages. Non-limiting examples of defects that may be identified include contamination, a cut, a deformation, a bulk an uneven temperature or any combination thereof. According to some embodiments, the method enables real time identification of individual contamination events of the sealing regions of packages. According to some embodiments, the identification of the defect (e.g. contamination of the sealing region by filling material) is performed during the filling phase, prior to and/or in addition to, monitoring sealing integrity during the sealing of the packaging process. As a result, the disclosed system and method enables preventing the advancement of a package with a defect e.g. contaminated sealing region to a sealing station of the packaging process and will thus reduce risk of low quality sealed packages exiting the packaging line. Additionally or alternatively, the disclosed system and method enables identification of a package with a defect e.g. a contaminated sealing region reaching a sealing station of the packaging process and will prevent distribution of improperly sealed packages.

According to some embodiments, the sealing region may be heated or cooled (e.g. using air blowers) prior or after the filling phase so as to increase the gradient between the radiation emitted from the sealing region material and the radiation emitted by the product (also referred to herein as "filling material"—e.g. a cosmetic cream). This may contribute to reliable detection of the defects particularly contamination in the sealing region, before the package enters the heat sealing station.

Heating or cooling the filling material (e.g. tooth paste) before or during the filling phase to increase the gradient between the radiation emitted from the package in the sealing region and the radiation emitted from the filling material (e.g. cosmetic cream) will improve the detection of the defects, particularly contamination in the sealing region before the package enters the heat sealing station.

According to some embodiments, the system and method disclosed herein may enable applying, optionally simultaneously, both thermal imaging and standard visual (VIS) imaging and applying image processing on both images to improve the reliability of the results.

According to some embodiments, the system and method disclosed herein may enable applying, optionally, both thermal imaging and standard visual (VIS) imaging and applying image processing on both images to improve the reliability of the results (e.g. visual imaging after or during the filling phase and thermal imaging after the sealing phase).

According to some embodiments, there is provided a method for detecting and/or monitoring defects in a sealing region of a container, the method comprising imaging at least a part of the sealing region of the container using at least one imaging camera operative at a wavelength in the range of 0.01 µm-14 µm; wherein the imaging is performed before, during and/or after the filling of the container with a filling material and prior to sealing of the container being completed; and determining, based on at least one frame obtained from the imaging, defects (if present) in at least part of the sealing region.

According to some embodiments, the defect may be a contamination, a cut, a deformation, a bulk an uneven temperature or any combination thereof. According to some embodiments, the defect is contamination of at least part of the sealing region by the filling material.

According to some embodiments, the imaging is performed at an Infra-Red (IR) wavelength in the range of 8 µm-14 µm (LWIR); 3 µm-5.4 µm (MWIR); 1 µm-3 µm (SWIR); 0.9 µm-1.7 µm (NIR), or any combination thereof. According to some embodiments, the imaging is performed at an Infra-Red (IR) wavelength in the range of 8 µm-14 µm (LWIR) or 3 µm-5.4 µm (MWIR); 1 µm-3 µm. According to some embodiments, the imaging is performed at an Infra-Red (IR) wavelength in the range of 8 µm-14 µm (LWIR). According to some embodiments, the imaging is performed after the filling of the container with a filling material.

According to some embodiments, the method further comprises a second imaging of at least part of the sealing region at a wavelength in the range of 3 µm-14 µm after the sealing of the container has been completed. According to some embodiments, the second imaging is performed at a wavelength of 8 µm-14 µm. According to some embodiments, the identifying of a defect (e.g. a contamination of the sealing region by the filling material) is further based on the second imaging of the sealing region.

According to some embodiments, the imaging is performed at a wavelength in the range of 0.4 µm-0.76 µm, in which case the method further includes a second imaging of at least part of the sealing region at a wavelength in the range of 3 µm-14 µm after the sealing of the container has been completed. According to some embodiments, the second imaging is performed at a wavelength of 8 µm-14 µm. According to some embodiments, the identifying of a defect (e.g. contamination of the sealing region by the filling material) is further based on the second imaging of the sealing region. According to some embodiments, the first imaging is performed after the filling of the container with a filling material.

According to some embodiments, the imaging further includes imaging at least the sealing region at a wavelength in the range of 0.01 µm-0.4 µm (UV).

According to some embodiments, the container is selected from the group consisting of: a canister; a blister package, a tube, a heat seal bag, pouch, sachet, bottle, or any combination thereof. According to some embodiments, the container is a tube.

According to some embodiments, the filling material is selected from the group consisting of: a liquid, a paste, a cream, a foam, or any combination thereof.

According to some embodiments, the method further includes heating at least the sealing region of the container prior to the imaging thereof; thereby increasing an image contrast between the sealing region and the filling material. According to some embodiments, heating the sealing region comprises blowing hot air onto the sealing region. According to some embodiments, the heating of the sealing region is performed prior to, during or after the filling of the container with the filling material.

According to some embodiments, the method further includes cooling at least the sealing region of the container prior to the imaging thereof; thereby increasing an image contrast between the sealing region and the filling material. According to some embodiments, the cooling of the sealing region comprises blowing cool air onto the sealing region. According to some embodiments, the cooling of the sealing region is performed prior to, during or after the filling of the container with the filling material.

According to some embodiments, the method further includes heating or cooling the filling material prior to the imaging; thereby increasing an image contrast between the sealing region and the filling material. According to some embodiments, the heating or cooling of the filling material is performed prior to, during or after the filling of the container with the filling material.

According to some embodiments, the method further includes illuminating the sealing region during or after the filling of the container; thereby increasing an image contrast between the sealing region and the filling material.

According to some embodiments, the sealing of the container is heat sealing.

According to some embodiments, there is provided a method for detecting, identifying and/or monitoring defects in a sealing region of a container, the method comprising imaging at least a part of the sealing region of the container using at least one imaging camera operative at a wavelength in the range of 0.01 μm-14 μm; heating and/or cooling at least part of the container, thereby increasing an image contrast between the sealing region and the filling material; and determining, based on at least one frame obtained from the imaging, defects in at least part of the sealing region.

According to some embodiments, the defect may be a contamination, a cut, a deformation, a bulk an uneven temperature or any combination thereof. According to some embodiments, the defect is contamination of at least part of the sealing region by the filling material.

According to some embodiments, heating/cooling the at least part of the container comprises blowing hot/cold air onto and/or into the container. According to some embodiments, the imaging of the sealing region is performed prior to, during or after the sealing of the container. According to some embodiments, the heating of the sealing region is performed prior to, during or after the sealing of the container.

According to some embodiments, there is provided a packaging system comprising a package line comprising at least a filling station for filling a container with a filling material and a sealing station for sealing of the container. The filling station comprises a first imaging camera operative at a wavelength in the range of 0.01 μm-14 μm; positioned and configured so as to enable imaging of at least part of a sealing region of the container before, during and/or after the filling of the container with the filling material and prior to sealing of the container being completed. The packaging system also includes a processor configured to identify defects, such as but not limited to contamination of the sealing region by the filling material, based on images obtained from the first camera.

According to some embodiments, the imaging by the first imaging camera is performed at an Infra-Red (IR) wavelength in the range of 8 μm-14 μm (LWIR); 3 μm-5.4 μm (MWIR); 1 μm-3 μm (SWIR); 0.9 μm-1.7 μm (NIR), or any combination thereof. According to some embodiments, the imaging by the first imaging camera is performed at an Infra-Red (IR) wavelength in the range of 8 μm-14 μm (LWIR) or 3 μm-5.4 μm (MWIR); 1-3 μm. According to some embodiments, the imaging by the first imaging camera is performed at an Infra-Red (IR) wavelength in the range of 8 μm-14 μm (LWIR). According to some embodiments, the imaging by the first imaging camera is performed after the filling of the container with a filling material. According to some embodiments, the sealing station comprises a second camera, wherein the imaging by the second camera is performed at a wavelength in the range of 3 μm-14 μm; wherein the second camera is positioned and configured to enable imaging of at least part of the sealing region of the container after the sealing of the container has been completed. According to some embodiments, the imaging by the second imaging camera is performed at a wavelength in the range of 8 μm-14 μm.

According to some embodiments, the imaging by the first imaging camera is performed at a wavelength in the range of 0.4 μm-0.76 μm, in which case the sealing station further includes a second camera, positioned and configured to enable imaging of at least part of the sealing region of the container after the sealing of the container has been completed. According to some embodiments, the imaging by the second camera is performed at a wavelength in the range of 3 μm-14 μm. According to some embodiments, the imaging by the second imaging camera is performed at a wavelength in the range of 8 μm-14 μm. According to some embodiments, the imaging by the first imaging camera is performed after the filling of the container with a filling material.

According to some embodiments, the processor is configured to identify the detect (e.g. contamination of the sealing region by the filling material), based on an integrated analysis of images obtained from the first and second cameras.

According to some embodiments, there is provided a method for monitoring, inspecting and or evaluating packaging line sealing performance, the method comprising: obtaining a plurality of images of at least a part of a sealing region of containers sealed on the packaging line, obtaining and/or determining at least one packaging line performance parameter, applying big data analysis on the plurality of images and on the at least one packaging line parameter, computing a trend in the sealing performance of the packaging line based on the analysis, and providing an indication regarding a detected and/or predicted sealing process deficiency when the trend is indicative of a decline in the sealing performance of the packaging line.

According to some embodiments, the imagining is performed using at least one imaging camera operative at a wavelength in the range of 0.9 μm-14 μm. According to some embodiments, the camera is positioned at a sealing station of the packaging line.

According to some embodiments, the at least one packaging line parameters comprise one or more sealing quality parameters and/or one or more sealing efficiency parameters.

According to some embodiments, computing the trend further comprises differentiating between sealing quality and sealing efficiency.

According to some embodiments, the one or more sealing quality parameters is selected from sealing temperature, sealing pressure, sealing time, laminate, supplier pressure applied on cutting jaws, customer complaints, flow of filling product, product weight, nozzle position, heat of filing material, viscosity of filling material or any combination thereof. Each possibility is a separate embodiment.

According to some embodiments, the one or more sealing efficiency parameters is selected from time between sealer cleanups, duration of cleanups, statistics of Teflon replacements on sealing bars, time between packaging line stops, duration of the stops, number of sealed products per minute, speed of packing line, or any combination thereof. Each possibility is a separate embodiment.

According to some embodiments, the method further comprises extracting one or more sealing features from the plurality of images. According to some embodiments, the big data analysis is further applied on the one or more sealing features. According to some embodiments, the sealing features are selected from sealing area, sealing length, sealing width, sealing disconnection, sealing uniformity, alignment, thermal radiation or any combination thereof. Each possibility is a separate embodiment.

According to some embodiments, the method further comprises issuing an alert if the computed trend is indicative of a detected or predicted sealing inefficiency. According to some embodiments, the method further comprises conducting a follow up inspection, wherein the follow up comprises taking into account actions taken to overcome the detected or predicted sealing inefficiency.

According to some embodiments, the method further (or alternatively) comprises obtaining a plurality of images captured during filling of the plurality of containers, obtaining and/or determining one or more filling parameters, applying big data filling analysis on the plurality of images captured during filling and on the at least one filing parameter, and computing a trend in a filing performance of the packaging line based on the filling analysis, and providing an indication regarding a detected and/or predicted filling process deficiency when the trend is indicative of a decline in the filing performance of the packaging line.

According to some embodiments, the one or more filling parameters is selected from filling speed, filling amount and/or weight, presence of contaminants in the filling material, presence of filling material on sealing region nozzle position, heat of filing material, viscosity of filling material or any combination thereof.

According to some embodiments, the big data analysis conducted with respect to the filling performance may be separate and/or independent from the big data analysis related to sealing performance. According to some embodiments, the big data analysis conducted with respect to the filling performance may be integrally conducted. This may for example enable detecting how filling performance influences sealing performance.

According to some embodiments, at times a deficient sealing may be due to inaccuracies in the filling process rather than inaccurate or inefficient sealing.

According to some embodiments, the container is selected from the group consisting of: a canister; a blister package, a tube, a heat seal bag, pouch, sachet, bottle, or any combination thereof. Each possibility is a separate embodiment.

According to some embodiments, the filling material is selected from the group consisting of: a liquid, a paste, a cream, a foam, or any combination thereof. Each possibility is a separate embodiment. According to some embodiments, the filling material is a food stuff.

According to some embodiments, the sealing is heat sealing.

According to some embodiments, there is provided a packaging system comprising: a package line comprising at least a filling station for filling a container with a filling material and a sealing station for sealing of the container; and an imaging camera operative at a wavelength in the range of 0.01 μm-14 μm, the imaging camera positioned and configured to enable imaging of at least part of a sealing region of container processed on the packaging line; and a processor configured to: obtain a plurality of images of at least a part of a sealing region of the containers processed on the packaging line, wherein the imagining is performed using at least one imaging camera operative at a wavelength in the range of 0.9 μm-14 μm, obtain and/or determine at least one packaging line parameter, apply big data analysis on the plurality of images and on the at least one packaging line parameter, compute a trend in the sealing performance of the packaging line based on the analysis, and provide an indication regarding a detected and/or predicted sealing process deficiency when the trend is indicative of a decline in the sealing performance. According to some embodiments, the term "decline" may refer to a decline of a predetermined size, e.g. an at least 1%, at least 5%, or at least 10% deviation from normal. Each possibility is a separate embodiment.

According to some embodiments, the at least one packaging line parameters comprise one or more sealing quality parameters and/or one or more sealing efficiency parameters.

According to some embodiments, the computing the trend further comprises differentiating between sealing quality and sealing efficiency.

According to some embodiments, the one or more sealing quality parameters is selected from sealing temperature, sealing pressure, sealing time, laminate, supplier pressure applied on cutting jaws, customer complaints, flow of filling product, product weight, nozzle position, heat of filing material, viscosity of filling material or any combination thereof. Each possibility is a separate embodiment.

According to some embodiments, the one or more sealing efficiency parameters is selected from time between sealer cleanups, duration of cleanups, statistics of Teflon replacements on sealing bars, time between packaging line stops, duration of the stops, number of sealed products per minute, speed of packing line, or any combination thereof. Each possibility is a separate embodiment.

According to some embodiments, the processor is further configured to extract one or more sealing features from the plurality of images, wherein the sealing parameters are selected from sealing area, sealing length, sealing width, sealing disconnection, sealing uniformity, alignment, thermal radiation or any combination thereof. According to some embodiments, the big data analysis is further applied on the one or more sealing parameters.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some, or none of the enumerated advantages.

In addition to the exemplary aspects and embodiments described above, further aspects and embodiments will become apparent by reference to the figures and by study of the following detailed descriptions.

BRIEF DESCRIPTION OF THE FIGURES

Examples illustrative of embodiments are described below with reference to figures attached hereto. In the figures, identical structures, elements, or parts that appear in more than one figure are generally labeled with a same numeral in all the figures in which they appear. Alternatively, elements or parts that appear in more than one figure may be labeled with different numerals in the different figures in which they appear. Dimensions of components and features shown in the figures are generally chosen for convenience and clarity of presentation and are not necessarily shown in scale. The figures are listed below.

FIG. 6 schematically illustrates a process for monitoring sealing efficiency of a tube during using a combination of visual and thermal imaging; wherein a first visual camera is positioned at the filling station and a second thermographic camera is positioned after the sealing station of the packaging process; according to some embodiments

DETAILED DESCRIPTION OF THE INVENTION

Figure 1:
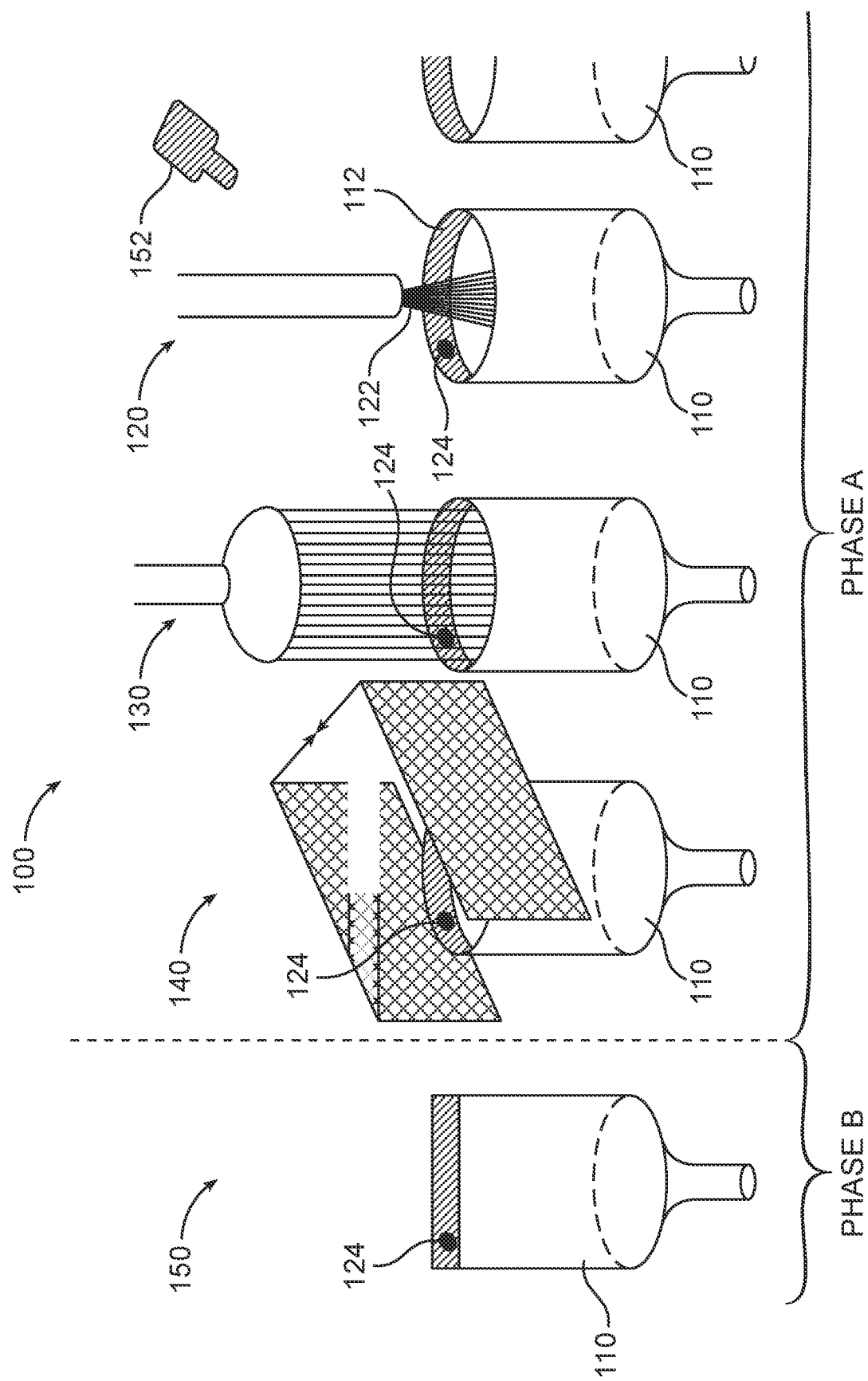
FIG. 1 schematically illustrates a process and system for monitoring sealing efficiency of a tube by applying thermographic imaging; wherein the thermographic camera is positioned at the filing station of the packaging process; according to some embodiments.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

According to some embodiments, there is provided a method for detecting, identifying and/or monitoring defects in a sealing region of a container, the method comprising imaging at least a sealing region of the container during and/or after the filling of the container with a filling material and prior to the completion of sealing of the container using a camera (also referred to herein as "pre-sealing imaging"), and determining, identifying and/or monitoring the defect (e.g. contamination of the sealing region by the filling material) based on the imaging. According to some embodiments, the camera is operative at a wavelength in the range of 0.01 μm-14 μm. According to some embodiments, the camera may be any camera enabling thermal imaging, such as, but not limited to, Mid Wave Infra-Red (MWIR), operative at a wavelength in the range of 3 μm-5.4 μm or Long Wave Infra-Red (LWIR), operative at a wavelength in the range of 8 μm-14 μm.

According to some embodiments, the defects identified may include contamination, a cut, a deformation, a bulk an uneven temperature or any combination thereof. Each possibility is a separate embodiment. According to some embodiments, the defect is a contamination of at least part of the sealing region by the filling material.

According to some embodiments, the method enables anticipating/estimating sealing efficiency prior to the sealing of the container. According to some embodiments, the method is for anticipating and/or estimating sealing efficiency of a heat-sealed container prior to its sealing being completed.

According to some embodiments, the method may be applicable for determining welding efficiency of an object formed of welded parts. Non-limiting examples of objects formed of welded parts include heat-formed packages (e.g. plastic blisters), tubes including two or more tube elements welded together (e.g. breath sample tubes including filters and the like). According to some embodiments, the welding may include hot gas welding, laser welding and/or ultrasonic welding. Each possibility is a separate embodiment. According to some embodiments, the welding may include applying or melting adhesives or by melting the packaging material together using conduction, induction heating or ultrasonic welding methods. Each possibility is a separate embodiment. According to some embodiments, determining welding efficiency of an object includes determining at least one parameter related to the quality of the welding.

As used herein the terms "container" and "package" may be used interchangeably and refer to any packaging meant suitable for containing a filling material and sized and shaped to enable filling and sealing on a package line. According to some embodiments, the container may be a primary container, i.e. the package that first envelops the product and holds it. Non-limiting examples of suitable containers include canisters (such as, but not limited to, yogurt canisters, canisters containing cosmetic products, and the like), blister packages (such as, but not limited to, blisters used for packaging of medical equipment, medicaments, batteries, and more), tubes (such as, but not limited to, toothpaste tubes or cosmetic tubes), heat seal bags or sachets (such as, but not limited to, heat sealed bags used for food packing, for packing of medical equipment, and the like), or any combination thereof. Each possibility is a separate embodiment.

As used herein, the term "sealing region" refers to part of the container which, after filling of the package, is configured to ensure its sealing. According to some embodiments, sealing of the package is considered to be completed once opposite sides of the sealing region have been pressed together, after or while applying heat thereto. According to some embodiments, the sealing may be heat sealing.

As used herein, the term "contamination" refers to spills/splashes of filling material or other material on at least the sealing region or part of the package; which impair the sealing of the package. According to some embodiments, the contamination may refer to uncleanness of the sealing region caused during the filling of the container with the filling material.

As used herein" the term "filling material" refers to the product filled in/contained within the container. According to some embodiments, the filling material may be a liquid, a paste, a cream, a foam, or any combination thereof. Each possibility is a separate embodiment. According to some embodiments, the filling material may be colorless, transparent, white, cream-colored, light-pink colored, or having a color similar to the color of at least the sealing region of the container. Each possibility is a separate embodiment.

According to some embodiments, the filling material may be food stuff, such as but not limited to lunch meats, cheeses, spreads, yogurts, and the like. Each possibility is a separate embodiment According to some embodiments, determining and/or identifying defects the sealing region of the container includes processing of images obtained during the filling. According to some embodiments, the imaging may include obtaining at least two images of the container during and/or after the filing of the container. As used herein, the term "at least two", when referring to the images obtained during imaging may refer to 2, 3, 4, 5 or more images. Each possibility is a separate embodiment.

According to some embodiments, obtaining two or more images, e.g. in interval may enable differentiating between signals caused by radiation from the sealing region and reflection caused by the packaging material itself. This due to the fact that the radiation gradually decreases as the sealing region cools down whereas reflection stays intact. That is, according to some embodiments, the determining of at least one parameter related to the quality of the object may be based on an integrated analysis of the images taking into account the cooling of the sealing region over time and the interval between the image frames taken.

According to some embodiments, image processing may include applying image processing algorithms. According to some embodiments, the image processing may include image contrast analysis, edge detection, image arithmetic, cross correlation between images, convolution between images or between an image to a predefined kernel, spatial frequency transformation and/or spatial filtering methods, temporal frequency transformation and temporal filtering methods, Fourier transforms, discrete Fourier transforms, discrete cosine transforms, morphological image processing, finding peaks and valleys (low and high intensity areas), image contours recognition, boundary tracing, line detection, texture analysis, histogram equalization, image deblurring, cluster analysis or any other suitable image processing known in the art or combinations thereof. Each possibility is a separate embodiment. According to some embodiments, the image processing may include deep learning. According to some embodiments, the image processing may include open CV. According to some embodiments, the determination/identification of a defect container (e.g. a container with a contaminated sealing region) may result in ejection of the container from the packaging line, arrest of the packaging process or any other suitable action required to prevent an improperly sealed container to discharged for distribution.

According to some embodiments, the system/method may further be configured to identify trends indicative of and/or responsible for an inefficient filling of the container, such as, but not limited to, inaccurate nozzle position, speed of packing line movement, heat of filing material, viscosity, and the like. According to some embodiments, the identifying of trends may include big-data analysis and/or machine learning techniques. According to some embodiments, when a defective trend is identified, the packaging line may be halted for inspection, calibration, and/or the like, thereby preventing defective sealing in multiple containers.

According to some embodiments, the system/method may be configured to identify packaging/sealing parameters, prior to the filling of a target container. As a non-limiting example, the system/method may be configured to identify/detect defects of the container's sealing region, prior to the filling thereof. As another non-limiting example, the system/method may be further configured to identify an improper orientation of a container prior to its filling. According to some embodiments, the correct/improper orientation of the container may be defined based on text printed on the container and/or the orientation of the sealing region and/or the shape of the container (e.g. of asymmetric containers).

According to some embodiments, the system/method may be configured to identify packaging/sealing parameters, after the filling but before heating of the target container's sealing region. As a non-limiting example, the system/method may be configured to identify/detect defects (e.g. contamination of the container's sealing region) after the filling but prior to the heating thereof. As another non-limiting example, the system/method may be further configured to identify an improper orientation of a container after filling but before the heating thereof. As another non-limiting example, the system/method may be configured to determine if a correct amount/quantity of filling material has entered the container after filling but before the heating thereof.

According to some embodiments, the system/method may be configured to identify packaging/sealing parameters, after the heating but before sealing of the target container's sealing region. As a non-limiting example, the system/method may be configured to identify/detect defects (e.g. contamination of the container's sealing region) after the heating but prior to the sealing thereof. As another non-limiting example, the system/method may be configured to identify an improper orientation of a container after heating but before the sealing thereof. As another non-limiting example, the system/method may be configured to determine if a correct amount/quantity of filling material has entered the container after heating but before the sealing thereof. As another non-limiting example, the system/method may be configured to determine if a correct/sufficient heating level of the sealing region has been reached prior to the sealing of the container. As another non-limiting example, the system/method may be configured to determine if correct width, location, and alignment of the sealing region.

According to some embodiments, the system/method may be configured to identify packaging/sealing parameters, after the sealing of the target container. As a non-limiting example, the system/method may be configured to determine whether as sufficient level of heating has been reached during sealing. As another non-limiting example, the system/method may be configured to determine the alignment and width of the sealing line. As another non-limiting example, the system/method may be configured to detect unsealed and/or improperly sealed parts/regions of the sealing line. As a non-limiting example, the system/method may be configured to determine whether a sufficient level of pressure has been reached during sealing. As a non-limiting example, the system/method may be configured to determine whether as sufficient time duration has been reached during sealing According to some embodiments, the imaging may be infra-red (IR) imaging. According to some embodiments, the imaging may be thermal imaging. According to some embodiments, the imaging may be MWIR imaging. According to some embodiments, the imaging may be LWIR imaging. According to some embodiments, the imaging is performed at a wavelength in the range of 0.76 μm-14 μm. According to some embodiments, the IR imaging may be short wave-imaging, medium wave imaging, long wave imaging or combinations thereof. Each possibility is a separate embodiment. As a non-limiting example, the imaging may include obtaining images (one or more) in the short-wave spectrum, images (one or more) in the medium wave spectrum and/or images (one or more) in the long wave spectrum (one or more) of the same container. According to some embodiments, the IR imaging may be performed at a wavelength in the range of 8 μm-14 μm; 3 μm-5.4 μm; 1-3 μm; 0.9 μm-1.7 μm, or any combination thereof. Each possibility is a separate embodiment. As a non-limiting example, the imaging of a container may include obtaining frames in each of or some of the aforementioned wavelength ranges.

According to some embodiments, the imaging may be UV imaging. According to some embodiments, the imaging may be performed at a wavelength in the range of 0.01 μm-0.4 μm. According to some embodiments, the UV imaging may be done instead of or in combination with the IR imaging.

According to some embodiments, the imaging may be visible light imaging. According to some embodiments, the imaging may be performed at a wavelength in the range of 0.4 μm-0.76 μm. According to some embodiments, the visible light imaging may be done in combination with the IR imaging and/or UV imaging. For example, the visible imaging may be used in combination with IR imaging enabling detection of defects based on both thermal changes and changes in color.

According to some embodiments, the method may include heating at least the sealing region of the container prior to the imaging thereof; thereby increasing an image contrast between the sealing region and the filling material. According to some embodiments, heating the container comprises heating the container to a temperature above 30° C., above 35° C., above 40° C., or above 50° C. Each possibility is a separate embodiment. According to some embodiments, the heating of the sealing region comprises blowing hot air onto the sealing region, into the container and/or on the outside of the container. According to some embodiments, the heating of the sealing region may be done prior to, during, or after the filling of the container with the filling material. Each possibility is a separate embodiment.

According to some embodiments, the method may include cooling at least the sealing region of the package prior to the imaging thereof; thereby increasing an image contrast between the sealing region and the filling material. According to some embodiments, cooling the container comprises cooling the container to a temperature below 20° C., below 15° C., below 10° C., or below 5° C. Each possibility is a separate embodiment. According to some embodiments, the cooling of the sealing region comprises blowing cool air onto the sealing region, into the container and/or on the outside of the container. According to some embodiments, the cooling of the sealing region may be done prior to, during or after the filling of the container with the filling material. Each possibility is a separate embodiment.

According to some embodiments, the method may include heating or cooling the filling material prior to the imaging; thereby increasing an image contrast between the sealing region and the filling material. According to some embodiments, heating the filling material comprises heating the filling material to a temperature above 30° C., above 35° C., above 40° C., or above 50° C. Each possibility is a separate embodiment. According to some embodiments, cooling the filling material comprises cooling the filling material to a temperature below 20° C., below 15° C., below 10° C., or below 5° C. Each possibility is a separate embodiment. According to some embodiments, the heating or cooling of the filling material may be done prior to, during or after the filling of the container with the filling material. Each possibility is a separate embodiment.

According to some embodiments, the method may include illuminating at least the sealing region of the container before, during or after the filling of the container; thereby increasing an image contrast between the sealing region and the filling material. According to some embodiments, the illumination may be IR illumination, visible light illumination, UV illumination, micro wave radiation, or combinations thereof. Each possibility is a separate embodiment.

According to some embodiments, the method may further include imaging at least the sealing region of the container after the sealing of the container (post-sealing imaging), using a second camera. According to some embodiments, the second camera may be operative at a wavelength in the range of 0.01 μm-14 μm. According to some embodiments, the after-sealing imaging may be infra-red (IR) imaging, as essentially described for the pre-sealing imaging. According to some embodiments, the after-sealing imaging may be UV imaging, as essentially described for the pre-sealing imaging. According to some embodiments, the after-sealing imaging may be visible light imaging, as essentially described for the pre-sealing imaging.

According to some embodiments, the pre-sealing and post-sealing imaging may be the same or different. As a non-limiting example, the pre-sealing imaging may be done using visual imaging, whereas the post-sealing imaging is done using IR thermal imaging. As another non-limiting example, the pre-sealing imaging may be done using short wave IR imaging, whereas the post-sealing imaging is done using long wave IR thermal imaging, including MWIR and LWIR IR thermal imaging. As another non-limiting example, the pre-sealing imaging may be done using a combination of IR imaging and visible imaging, whereas the post-sealing imaging is done using IR imaging alone.

According to some embodiments, the imaging may be visible light imaging. According to some embodiments, the imaging may be performed at a wavelength in the range of 0.4 μm-0.76 μm. According to some embodiments, the visible light imaging may be done in combination with the IR imaging and/or UV imaging.

According to some embodiments, the method further includes evaluating sealing integrity, based on an integrated analysis of pre-sealing and post-sealing imaging. As used herein, the term "integrated analysis" may refer to image processing including applying processing algorithms to pre-sealing and post-sealing images and identifying improper sealing based on image parameters deduced from at least one pre-sealing image and at least one post-sealing image.

According to some embodiments, the method further includes squeezing or otherwise applying pressure on the container, prior to the post-sealing imaging. Squeezing the container will, in the case of incomplete sealing, result in small amounts of filler material to leak out of the container. Advantageously, thermal imaging of the container allows detecting such leaks, and thus improper sealing of the container due to its high sensitivity to differences in the emissivity of a product and its low sensitivity to reflections.

According to some embodiments, there is provided a packaging system comprising a packaging line comprising at least a filling station for filling a container with a filling material and a sealing station for sealing of the container. The filing station of the package line includes a camera operative at a wavelength in the range of 0.01 μm-14 μm. The camera is positioned and configured to enable imaging of at least a part of the sealing region of the container during and/or after the filling of the container with the filling material and prior to the sealing of the container being completed. According to some embodiments, the packaging line further includes a processor configured to identify defects (e.g. contamination of the sealing region by the filling material), based on images obtained from the camera.

As used herein, the terms "packaging line" and "package line" may be used interchangeably and refer to an automatic process of enclosing products within containers or any kind of packages. According to some embodiments, the term refers to automated enclosing of products within heat-sealed containers. According to some embodiments, the package line includes at least a filling station and a sealing station. As used herein the term "filling station" refers to part of the packaging line where the filling material is poured into, sprayed into, or otherwise dispensed into the container. As used herein, the term "sealing station" refers to part of the packaging line where the container holding the filling material is hermetically sealed by pressing together the shores of the container's sealing region after or during a heating phase. According to some embodiments, the packaging line further includes a heating station, located prior to the sealing station. As used herein, the term "heating station" refers to part of the packaging line where the sealing region is heated in preparation for sealing. According to some embodiments, the sealing further includes applying an adhesive to the shores prior to the shores being pressed together. According to some embodiments, the packaging line further includes a discharge station. As used herein the term "discharge station" refers to part of the packaging line where the sealed container is forwarded for further processing, such as, but not limited to, secondary packaging.

As used herein, the term "big data analysis" may refer to a form of advanced analytics, which involve complex applications with elements such as predictive models, statistical algorithms and what-if analysis powered by analytics systems. According to some embodiments, the big data analysis may have a holistic approach that relies on:

Trend analysis, for failure prevention.
SPC (Statistical Process Control) software, for root cause analysis.

According to some embodiments, the big data analysis is advantageously provides the following benefits:

Improvement of production efficiency/yield
Increased Mean Time Between Failures (MTBF)—by alerting on a trend indicating reduced quality/efficiency of the sealing and/or filling of containers, a failure that has not yet happened can be treated on time e.g. during routine maintenance.
Reduced failure time (i.e. the time during which the packaging line is in a failure mode)
Increasing production rate inter alia due to the confidence in the real time quality analysis of the products.

According to some embodiments, the big data analysis may include applying machine learning algorithms on the plurality of images and the at least one packaging line parameter. According to some embodiments, the machine learning may be supervised. According to some embodiments, the machine learning may be unsupervised. According to some embodiments, the machine learning may include feature extraction. According to some embodiments, the machine learning may include neural network algorithms.

According to some embodiments, the camera is positioned at the filling station of the process line. According to some embodiments, the camera is positioned at the heating station of the process line. According to some embodiments, the camera is positioned at the sealing station of the process line.

According to some embodiments, the camera is an IR camera (e.g. NIR, SWIR) and/or IR thermographic (thermal imaging) camera (e.g. MWIR, LWIR) configured to enable IR imaging as essentially described herein. Additionally or alternatively, the camera may enable imaging at the visible and/or UV spectrum, as essentially described herein.

According to some embodiments, the processor unit may be an integral part of the packaging line. According to some embodiments, the processor may be an external and/or adjunct to the computing device, such as, but not limited to, a mobile, smartphone, tablet, pc, or any dedicated computing device. Each possibility is a separate embodiment. According to some embodiments, the processor may be a virtual processor, such as an internet enabled device (i.e. cloud computing). According to some embodiments, the processor may be configured to identify defects in the sealing region by performing image processing, e.g. applying image processing algorithms, on the images obtained from the camera, as essentially described herein.

According to some embodiments, the sealing station comprises a second camera (online or offline) operative at a wavelength in the range of 0.01 μm-14 μm; wherein the second camera is positioned and configured to enable imaging of at least the sealing region of the container after the sealing of the container has been completed. According to some embodiments, the second camera may be positioned at the discharge station of the package line. According to some embodiments, the first and/or second cameras are thermographic cameras. According to some embodiments, the first and/or second cameras are configured to operate at a wavelength in the range of 0.76 μm-14 μm. According to some embodiments, the first and/or second imaging is performed at a wavelength in the range of 8 μm-14 μm; 3 μm-5.4 μm; 1 μm-3 μm; 0.9 μm-1.7 μm, or any combination thereof. Each possibility is a separate embodiment. For example, the imaging may include obtaining frames in each of or some of the aforementioned wavelength ranges, as essentially described herein.

According to some embodiments, the packaging line may include more than two cameras, such as 3, 4, 5 or more cameras. These cameras may be distributed along the stations of the packaging line (e.g. one at each station). According to some embodiments, a particular station may include more than one camera; while other stations may include one only or be devoid of cameras.

According to some embodiments, the processor may be further configured to identify improper sealing, based on an integrated analysis of images obtained from the first and second cameras. According to some embodiments, the integrated analysis may include applying processing algorithms to images obtained from both cameras and identifying improper sealing based on image parameters deduced/extrapolated from at least one image obtained from each of the cameras.

According to some embodiments, the packaging line further comprises a "quality control (QC) station" at which the container is squeezed or otherwise has pressure applied thereon. According to some embodiments, the QC station is positioned after the sealing station, but prior to the second camera.

Reference is now made to FIG. 1, which schematically illustrates a system 100 for monitoring sealing efficiency of a tube 110, using thermographic imaging (thermal imaging). System 100 includes a pre-sealing phase, indicated as phase A and a post-sealing phase indicated as phase B. Phase A includes a filling station 120, a heating station 130, and a sealing station 140. Phase B includes a discharge station 150, where tube 110, now hermetically sealed, can be forwarded for further processing. System 100 includes a thermal imaging IR camera 125 positioned at filling station 120 and configured to image a sealing region 112 of tube 110 during filling of tube 110 with filling material 122. The imaging by thermal imaging IR camera 125 may be performed in a wavelength in the range of 3 μm-14 μm, preferably 8 μm-14 μm. System 100 further includes a processor (not shown) configured to obtain one or more image frames from thermal imaging IR camera 125, to process the images and to identify defects, such as contamination 124 on sealing region 112 of tube 110. According to some embodiments, once a defect is identified, tube 110 may be ejected from the processing line, prior to reaching the next station, here prior to reaching heat station 130. Alternatively, defect tube 110 may be ejected at discharge station 150. According to some embodiments, the processor may be further configured to identify trends and/or operational mistuning in the filling station, based on images of one or more tubes passing through the packaging line, as essentially described herein.

Figure 2:
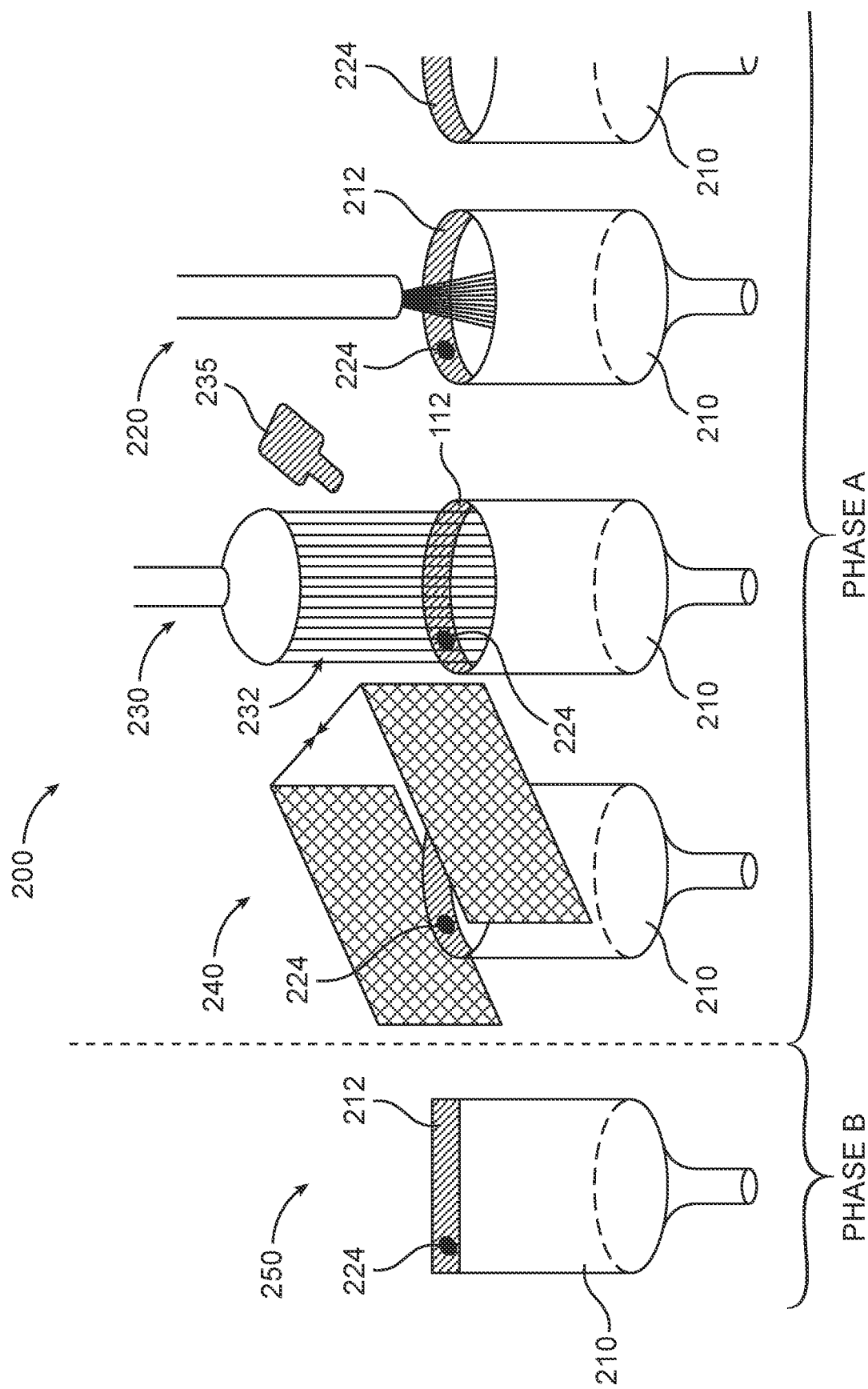
FIG. 2 schematically illustrates a process for monitoring sealing efficiency of a tube during using thermographic imaging; wherein the thermographic camera is positioned at the hot air heating station of the packaging process; according to some embodiments.

Reference is now made to FIG. 2, which schematically illustrates a system 200 for monitoring sealing efficiency of a tube 210, using thermographic imaging. System 200 includes a pre-sealing phase, indicated as phase A and a post-sealing phase indicated as phase B. Phase A includes a filling station 220, a heating station 230, and a sealing station 240. Phase B includes a discharge station 250, where tube 210, now hermetically sealed, can be forwarded for further processing. System 200 includes a thermal imaging IR camera 235 positioned at heating station 230 and configured to image a sealing region 212 of tube 210 during heating of sealing region 212 by hot air 232. The imaging by thermal imaging IR camera 235 may be performed in a wavelength in the range of 3 μm-14 μm, preferably 8 μm-14 μm. System 200 further includes a processor (not shown) configured to obtain one or more image frames from thermal imaging IR camera 235, to process the images and to identify defects, such as contamination 224 on sealing region 212 of tube 210. According to some embodiments, once a defect is identified, tube 210 may be ejected from the processing line, prior to reaching the next station, here prior to reaching sealing station 240. Alternatively, defect tube 210 may be ejected at discharge station 250. According to some embodiments, the processor may be further configured to identify trends and/or operational mistuning in the hot air heating station, based on images of one or more tubes passing through the packaging line, as essentially described herein.

Figure 3:
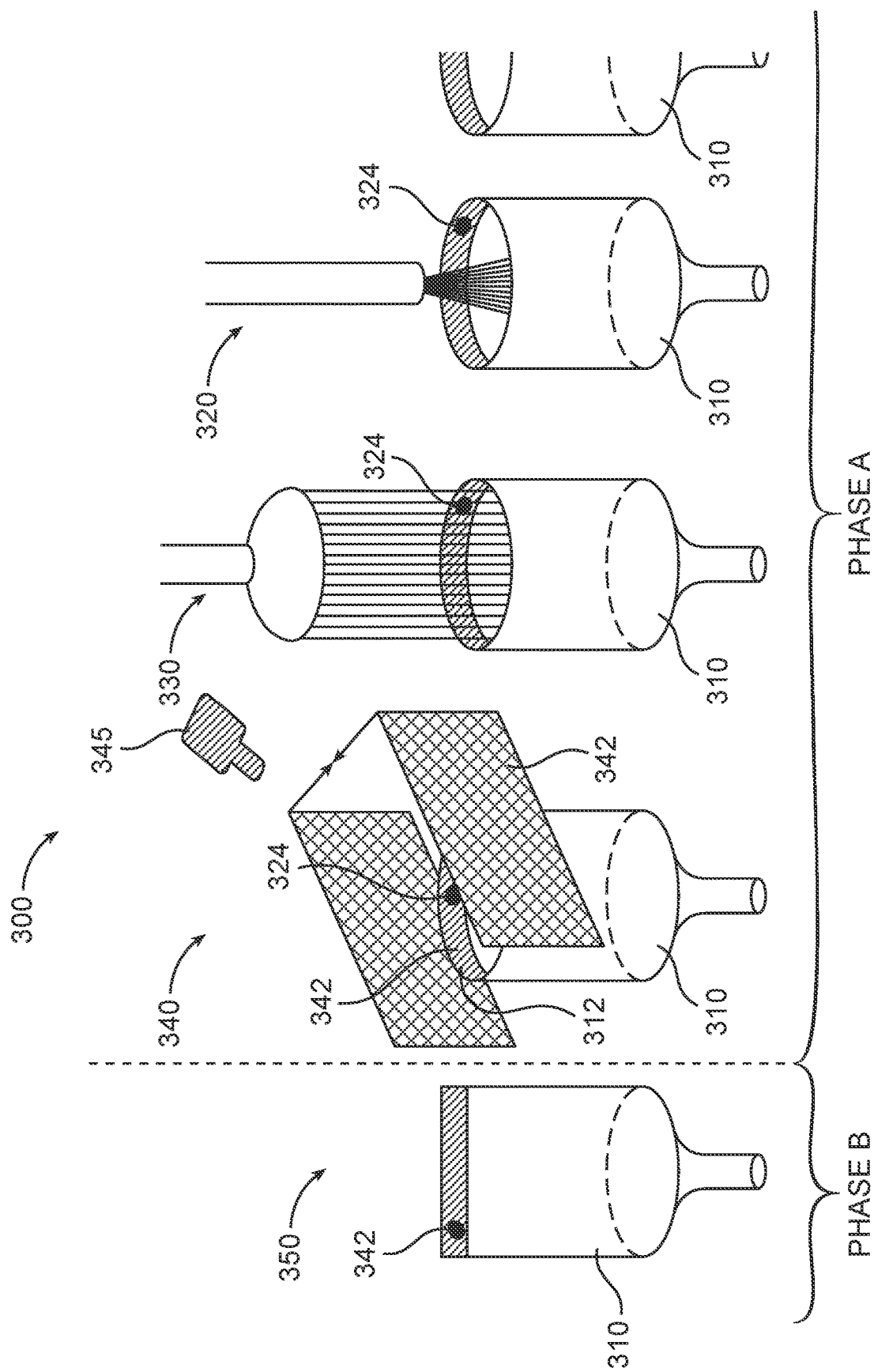
FIG. 3 schematically illustrates a process for monitoring sealing efficiency of a tube during using thermographic imaging; wherein the thermographic camera is positioned at the sealing station of the packaging process; according to some embodiments.

Reference is now made to FIG. 3, which schematically illustrates a system 300 for monitoring sealing efficiency of a tube 310, using thermographic imaging. System 300 includes a pre-sealing phase, indicated as phase A and a post-sealing phase indicated as phase B. Phase A includes a filling station 320, a heating station 330, and a sealing station 340. Phase B includes a discharge station 350, where tube 310, now hermetically sealed, can be forwarded for further processing. System 300 includes a thermal imaging IR camera 345 positioned at sealing station 330 and configured to image a sealing region 312 of tube 310 during sealing of sealing region 312 by pressing plates 342. The imaging by thermal imaging IR camera 345 may be performed in a wavelength in the range of 3 μm-14 μm, preferably 8 μm-14 μm. System 300 further includes a processor (not shown) configured to obtain one or more image frames from thermal imaging IR camera 345, to process the images and to identify defects, such as contamination 324 on sealing region 312 of tube 310. According to some embodiments, once a defect is identified, tube 310 may be ejected from the processing line, prior to reaching the next station, here prior to reaching discharge station 350. Alternatively, defect tube 310 may be ejected at discharge station 350. According to some embodiments, the processor may be further configured to identify trends and/or operational mistuning in the sealing station, based on images of one or more tubes passing through the packaging line, as essentially described herein.

Figure 4:
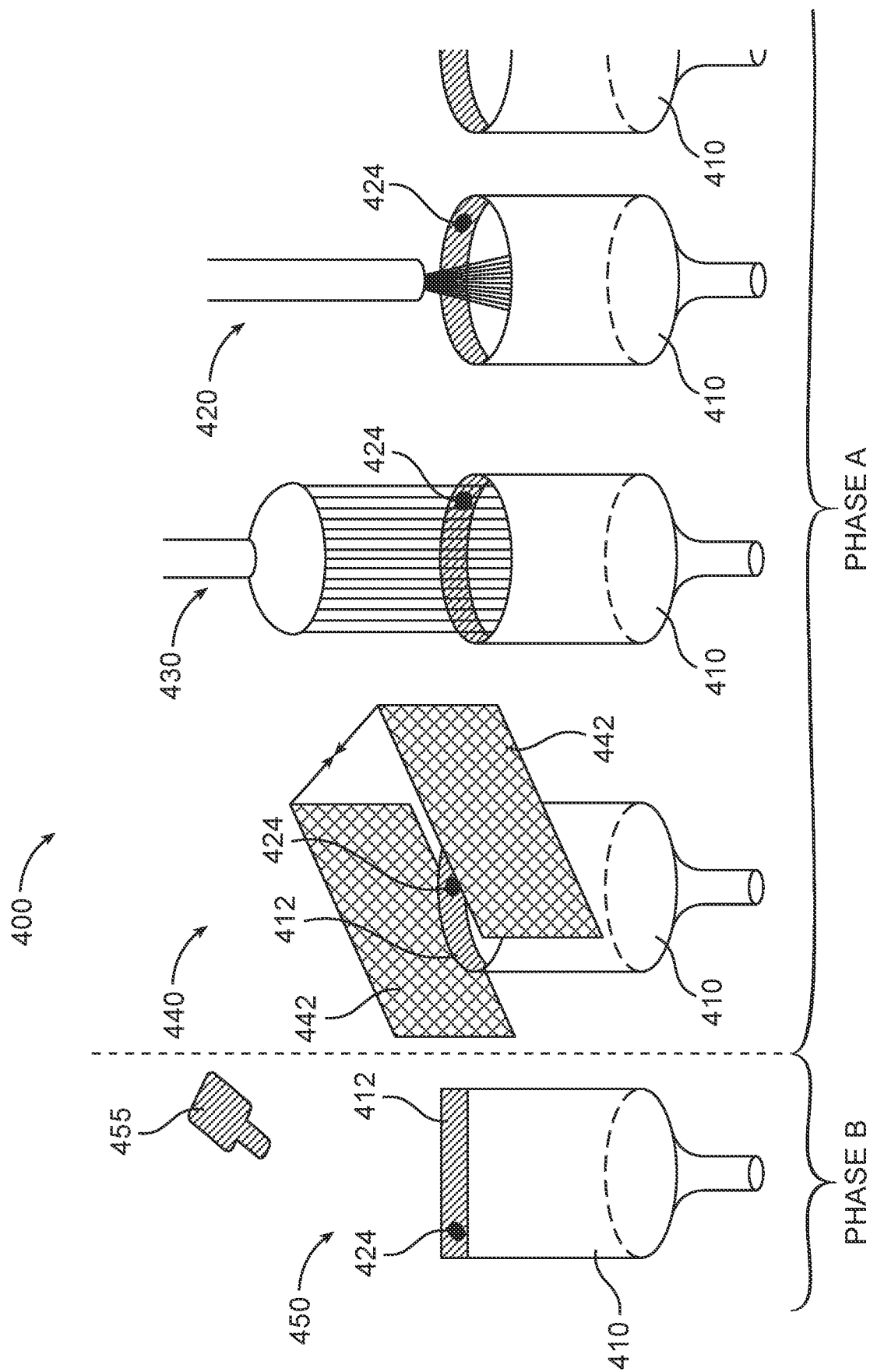
FIG. 4 schematically illustrates a process for monitoring sealing efficiency of a tube during using thermographic imaging; wherein the thermographic camera is positioned after the sealing station of the packaging process; according to some embodiments.

Reference is now made to FIG. 4, which schematically illustrates a system 400 for monitoring sealing efficiency of a tube 410, using thermographic imaging. System 400 includes a pre-sealing phase, indicated as phase A and a post-sealing phase indicated as phase B. Phase A includes a filling station 420, a heating station 430, and a sealing station 440. Phase B includes a discharge station 450, where tube 410, now hermetically sealed, can be forwarded for further processing. System 400 includes a thermal imaging IR camera 455 positioned at discharge station 450 and configured to image a sealing region 412 of tube 410 after sealing of sealing region 412 by pressing plates 442. The imaging by thermal imaging IR camera 455 may be performed in a wavelength in the range of 3 μm-14 μm, preferably 8 μm-14 μm. System 400 further includes a processor (not shown) configured to obtain one or more image frames from thermal imaging IR camera 455, to process the images and to identify defects, such as contamination 424 on sealing region 412 of tube 410. According to some embodiments, defect tube 410 may be ejected at discharge station 450.

Figure 5:
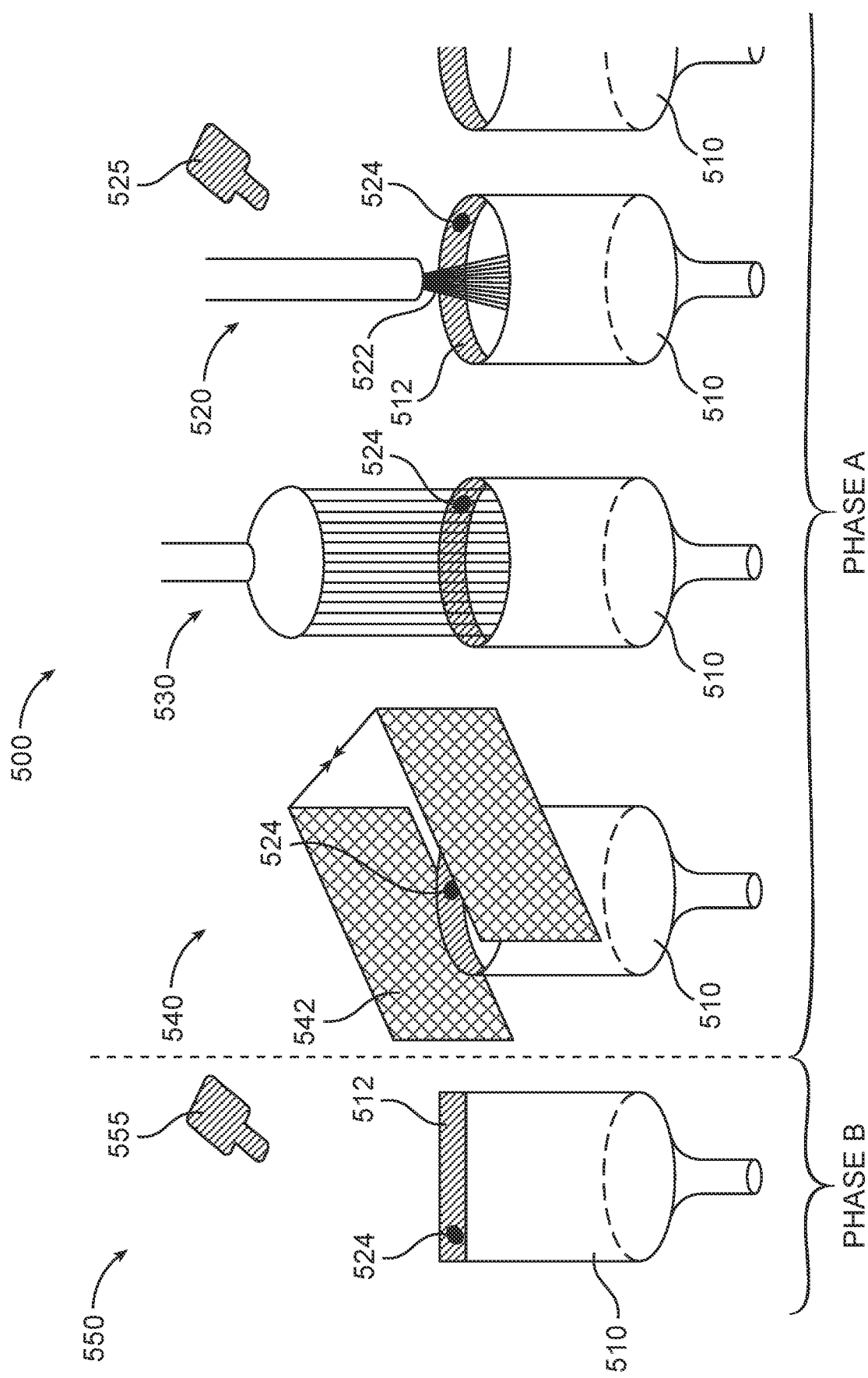
FIG. 5 schematically illustrates a process for monitoring sealing efficiency of a tube during using thermographic imaging; wherein a first thermographic camera is positioned at the filling station and a second thermographic camera is positioned after the sealing station of the packaging process; according to some embodiments.

Reference is now made to FIG. 5, which schematically illustrates a system 500 for monitoring sealing efficiency of a tube 510, using thermographic imaging. System 500 includes a pre-sealing phase, indicated as phase A and a post-sealing phase indicated as phase B. Phase A includes a filling station 520, a heating station 530, and a sealing station 540. Phase B includes a discharge station 550, where tube 510, now hermetically sealed, can be forwarded for further processing. System 500 includes a first thermal imaging IR camera 525 positioned at filling station 520 and configured to image a sealing region 512 of tube 510 during filling of tube 510 with filling material 522. System 500 further includes a second thermal imaging IR camera 555 positioned at discharge station 550 and configured to image a sealing region 512 of tube 510 after sealing of sealing region 512 by pressing plates 542. The imaging by first thermal imaging IR camera 535 and second thermal imaging IR camera 555 may be performed in a wavelength in the range of 3 μm-14 μm, preferably 8 μm-14 μm. System 500 further includes a processor (not shown) configured to obtain one or more image frames from first thermal imaging IR camera 535 and from second thermal imaging IR camera 555 and to process the images obtained to identify defects, such as contamination 524 on sealing region 512 of tube 510 and to evaluate sealing integrity. According to some embodiments, defect tube 510 may be ejected at discharge station 550. First thermal imaging IR camera 525 and second thermal imaging IR camera 555 are here shown to be located at the filling station and at the discharge station, respectively. It is however understood that other positions are likewise applicable and within the scope of this disclosure. It is further understood, that system 500 may include more than two cameras, as essentially described herein.

Reference is now made to FIG. 6, which schematically illustrates a system 600 for monitoring sealing efficiency of a tube 610, using imaging. System 600 includes a pre-sealing phase, indicated as phase A and a post-sealing phase indicated as phase B. Phase A includes a filling station 620, a heating station 630, and a sealing station 640. Phase B includes a discharge station 650, where tube 610, now hermetically sealed, can be forwarded for further processing. System 600 includes a first visual imaging camera 625 positioned at filling station 620 and configured to image a sealing region 612 of tube 610 during filling of tube 610 with filling material 622. The imaging by first visual imaging camera 625 is performed in a wavelength in the visible spectrum range of 0.4 μm-0.76 μm and may be configured to identify defects based on visual changes (e.g. color stains) on tube 610. System 600 further includes a second thermal imaging IR camera 655 positioned at discharge station 650 and configured to image a sealing region 612 of tube 610 after sealing of sealing region 612 by pressing plates 642. The imaging by second thermal imaging IR camera 655 is performed in a wavelength in the range of 3 μm-14 μm, preferably 8 μm-14 μm. System 600 further includes a processor (not shown) configured to obtain one or more image frames from first visual imaging camera 635 and from second thermal imaging IR camera 655, and to process the images to identify defects, such as contamination 624 on sealing region 612 of tube 610 and to evaluate sealing integrity. It is understood that neither imaging in the visual spectrum alone nor thermal imaging after completion of sealing alone are insufficient for reliable evaluation of the integrity of tube 610 whereas the combined pre-sealing visual imaging and post-sealing thermal imaging may provide a reliable measure. According to some embodiments, defect tube 610 may be ejected at discharge station 650. First visual imaging camera 635 and second thermal imaging IR camera 655 are here shown to be located at the filling station and at the discharge station, respectively. It is however understood that other positions are likewise applicable and within the scope of this disclosure. It is further understood, that system 600 may include more than two cameras, as essentially described herein.

With reference to the above Figures, it is understood that the camera may be positioned so as to directly focus on the container, as depicted, or indirectly using mirrors, beam splitters, lenses or any other optical element allowing indirect imaging of the container.

Figure 9:
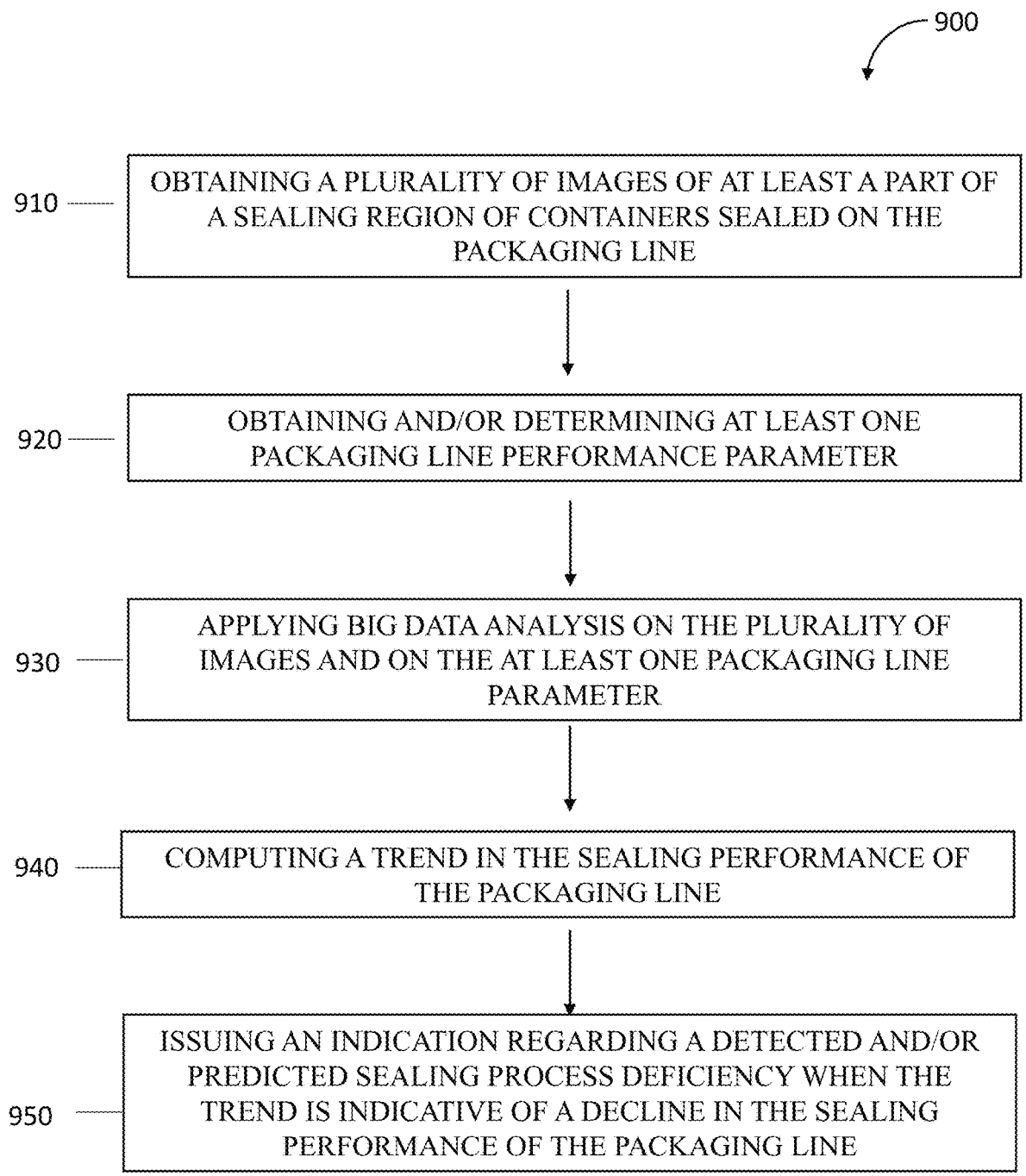
FIG. 9 is an illustrative flowchart of a method for monitoring and/or inspecting a packaging line's sealing performance, according to some embodiments.

Reference may now be made to FIG. 9, is an illustrative flowchart of a method for improving packaging line sealing performance 900, according to some embodiments. According to some embodiments, the packaging may be of any filling material such as a liquid, a paste, a cream, a foam, a food stuff (e.g. a snack) in any kind of container such as a blister package, a tube, a heat seal bag, pouch, sachet, bottle. Each possibility is a separate embodiment.

In step 910 of the method a plurality of images of at least a part of a sealing region of containers sealed (e.g. by heat-sealing) on the packaging line is obtained. According to some embodiments, the imagining is performed using at least one imaging camera operative at a wavelength in the range of 0.9 μm-14 μm. According to some embodiments, the camera is positioned at a sealing station of the packaging line. According to some embodiments, one or more sealing features may be extracted from the plurality of images. According to some embodiments, the feature extraction may be accomplished using feature extraction/selection techniques. According to some embodiments, the sealing features are selected from sealing area, sealing length, sealing width, sealing disconnection, sealing uniformity, alignment, thermal radiation or any combination thereof. Each possibility is a separate embodiment. According to some embodiments, the feature extraction may be automated e.g. be accomplished by applying deep learning algorithms on the plurality of images.

In step 920, at least one packaging line performance parameter is obtained (e.g. from a sensor) and/or determined (e.g. input by a user as a result of inspection of the packaging line). According to some embodiments, the at least one packaging line parameters comprise one or more sealing quality parameters and/or one or more sealing efficiency parameters. According to some embodiments, the one or more sealing quality parameters is selected from sealing temperature, sealing pressure, sealing time, laminate, supplier pressure applied on cutting jaws, customer complaints, flow of filling product, product weight, nozzle position, heat of filing material, viscosity of filling material or any combination thereof. Each possibility is a separate embodiment. According to some embodiments, the one or more sealing efficiency parameters is selected from time between sealer cleanups, duration of cleanups, statistics of Teflon replacements on sealing bars, time between packaging line stops, duration of the stops, number of sealed products per minute, speed of packing line, or any combination thereof. Each possibility is a separate embodiment. According to some embodiments, one or more features may be extracted from the at least one packaging line performance parameter for example by using feature extraction/selection techniques. According to some embodiments, one or more features may be extracted from the at least one packaging line performance parameter by applying neural network algorithms.

In step 930, big data analysis is applied on the plurality of images and on the at least one packaging line parameter (and/or parameters extracted therefrom). According to some embodiments, the big data analysis may include applying machine learning algorithms on the plurality of images and the at least one packaging line parameter. According to some embodiments, the machine learning may be supervised. According to some embodiments, the machine learning may be unsupervised.

In step 940, a trend in the sealing performance of the packaging line may be computed. Advantageously, the trend may enable detecting that a defect in sealing of the containers is about to happen, rather than only detecting defects as they happen. According to some embodiments, the big data analysis may further enable differentiating between declines in sealing quality (i.e. reduced sealing integrity) and declines in sealing efficiency (e.g. increased duration of the sealing process). According to some embodiments, the big data analysis may further detect the underlining cause of a decline in the sealing performance of the packaging line, based on the big data analysis (e.g. the underlying cause of sealing integrity and/or efficiency).

In step 950, an indication regarding a detected and/or predicted sealing process deficiency may optionally be issued, when the trend is indicative of a decline in the sealing performance of the packaging line. According to some embodiments, the method further comprises issuing an alert if the computed trend is indicative of a detected or predicted sealing inefficiency. According to some embodiments, the method further comprises conducting a follow up inspection, wherein the follow up comprises taking into account actions taken to overcome the detected or predicted sealing inefficiency.

Figure 10:
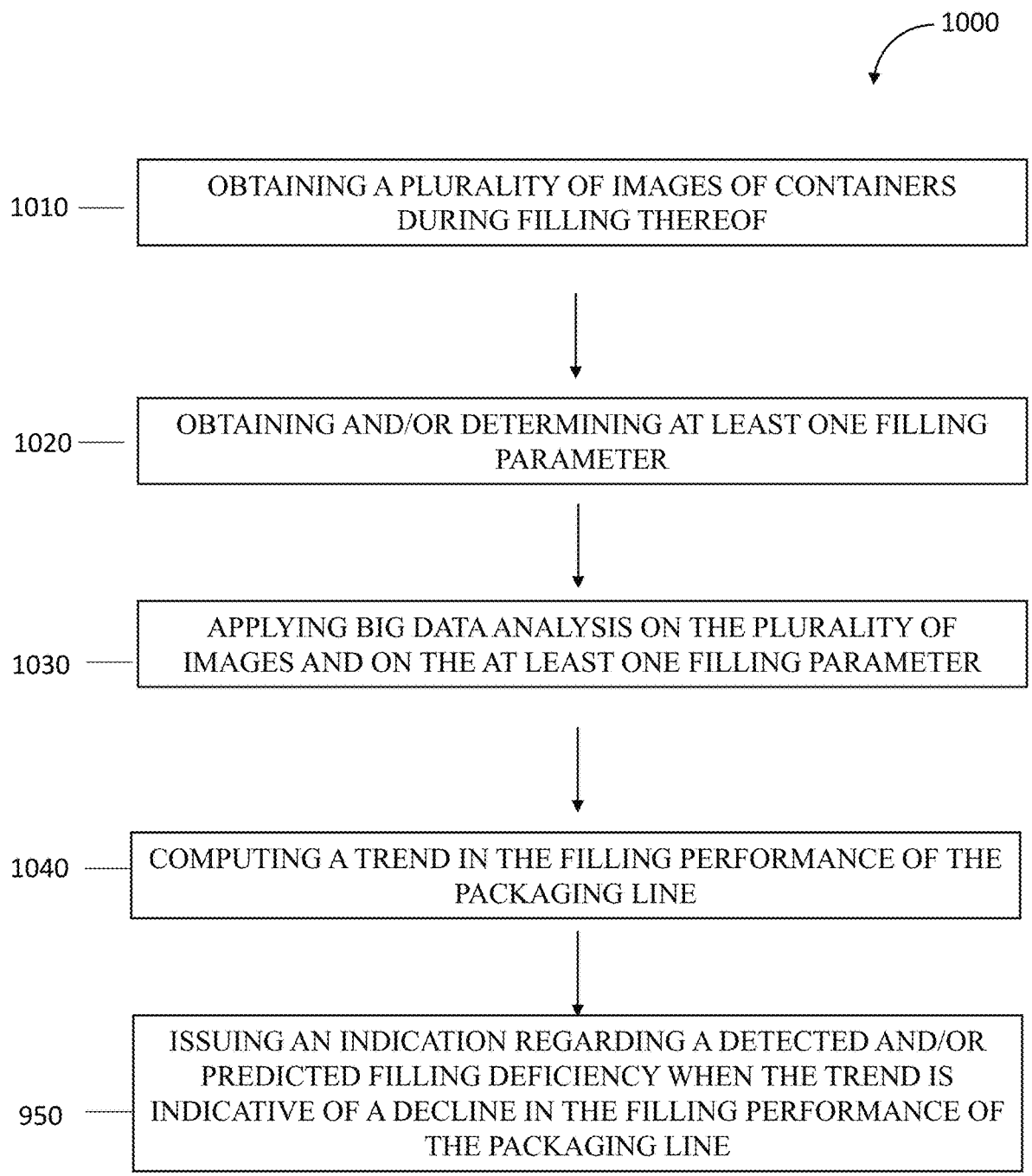
FIG. 10 is an illustrative flowchart of a method for monitoring and/or inspecting packaging line's filling performance, according to some embodiments.

Reference may now be made to FIG. 10, is an illustrative flowchart of a method for monitoring, inspecting and/or evaluating packaging line filing performance 1000, according to some embodiments. According to some embodiments, the filling material may be of any filling material such as a liquid, a paste, a cream, a foam, a food stuff (e.g. a snack) in any kind of container such as a blister package, a tube, a heat seal bag, pouch, sachet, bottle. Each possibility is a separate embodiment. According to some embodiments, the evaluation of filling performance may be integrally part of the method 900. Alternatively, method 1000 may be a stand-alone method.

In step 1010, a plurality of images captured during filling of a plurality of containers is obtained. According to some embodiments, the imagining is performed using at least one imaging camera operative at a wavelength in the range of 0.9 μm-14 μm. According to some embodiments, the camera is positioned at a filing station of the packaging line. According to some embodiments, one or more filing features may be extracted from the plurality of images. According to some embodiments, the feature extraction may be accomplished using feature extraction/selection techniques. According to some embodiments, the feature extraction may be automated e.g. be accomplished by applying deep learning algorithms on the plurality of images.

In step 1020, at least one filing parameter is obtained (e.g. from a sensor) and/or determined (e.g. input by a user as a result of inspection of the filling station). According to some embodiments, the at least one filling parameters comprise one or more of filling speed, filling amount and/or weight, presence of contaminants in the filling material, presence of filling material on sealing region nozzle position, heat of filing material, viscosity of filling material or any combination thereof. Each possibility is a separate embodiment.

In step 1030, big data analysis is applied on the plurality of images and on the at least one filling parameter (and/or parameters extracted therefrom). According to some embodiments, the big data analysis may include applying machine learning algorithms on the plurality of images and the at least one filling parameter. According to some embodiments, the machine learning may be supervised. According to some embodiments, the machine learning may be unsupervised.

In step 1040, a trend in the filling performance of the packaging line may be computed. Advantageously, the trend may enable detecting that a defect in filling of the containers is about to happen, rather than only detecting defects as they happen. According to some embodiments, the big data analysis may further enable differentiating between declines in filling quality (e.g., imprecise filling and/or contamination of the sealing etc.) and declines in sealing efficiency (e.g. increased duration of the filling process). According to some embodiments, the big data analysis may further detect the underlining cause of a decline in the filling performance of the packaging line, based on the big data analysis (e.g. the underlying cause of filling integrity and/or efficiency), such as bit not limited to inaccurate nozzle position.

In step 1050, an indication regarding a detected and/or predicted filling deficiency may optionally be issued, when the trend is indicative of a decline in the filling performance of the packaging line. According to some embodiments, the method further comprises issuing an alert if the computed trend is indicative of a detected or predicted filling inefficiency. According to some embodiments, the method further comprises conducting a follow up inspection, wherein the follow up comprises taking into account actions taken to overcome the detected or predicted filling inefficiency.

EXAMPLES

Example 1—Thermal Imaging of Lunch Meat Packaging

Figure 7A:
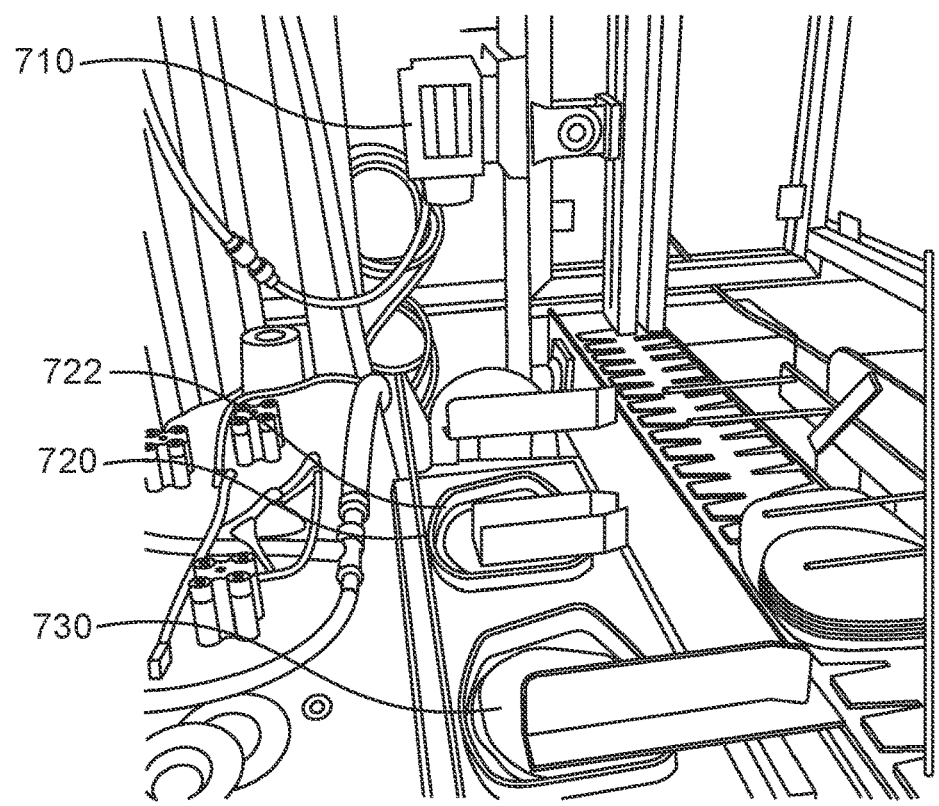
FIG. 7A shows the hereindisclosed system for thermographic imaging (thermal imaging) of containers, as implemented for lunch meat packaging, before sealing of the container.
Figure 7B:
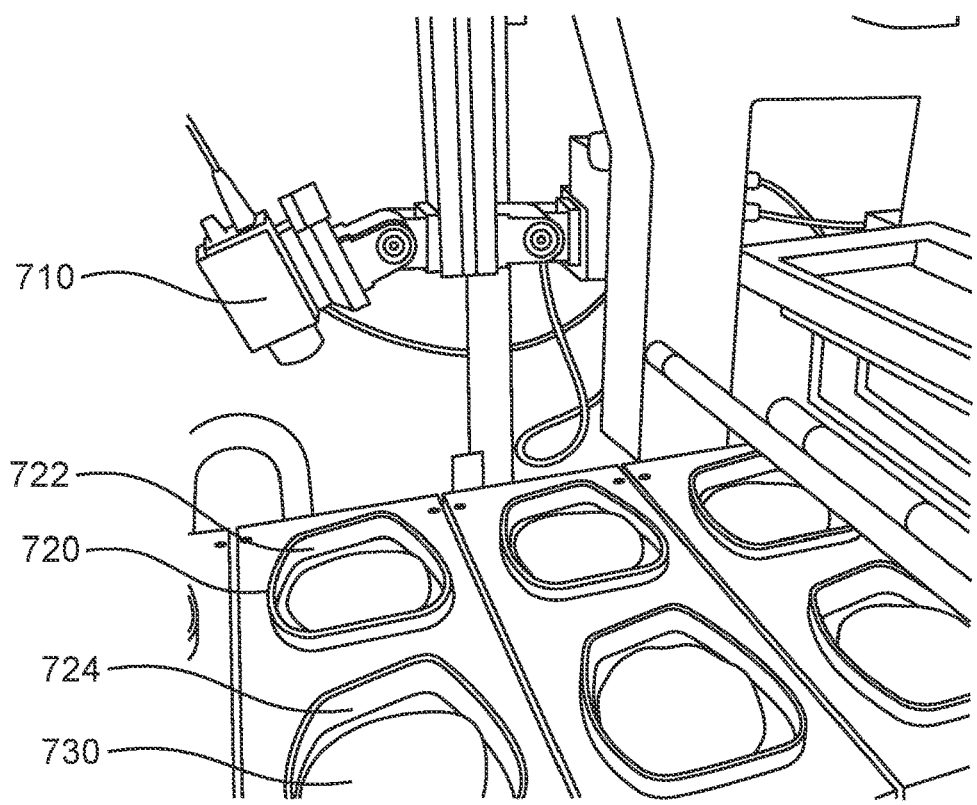
FIG. 7B shows the hereindisclosed system for thermographic imaging (thermal imaging) of containers, as implemented for lunch meat packaging, after sealing of the container.
Figure 8A:
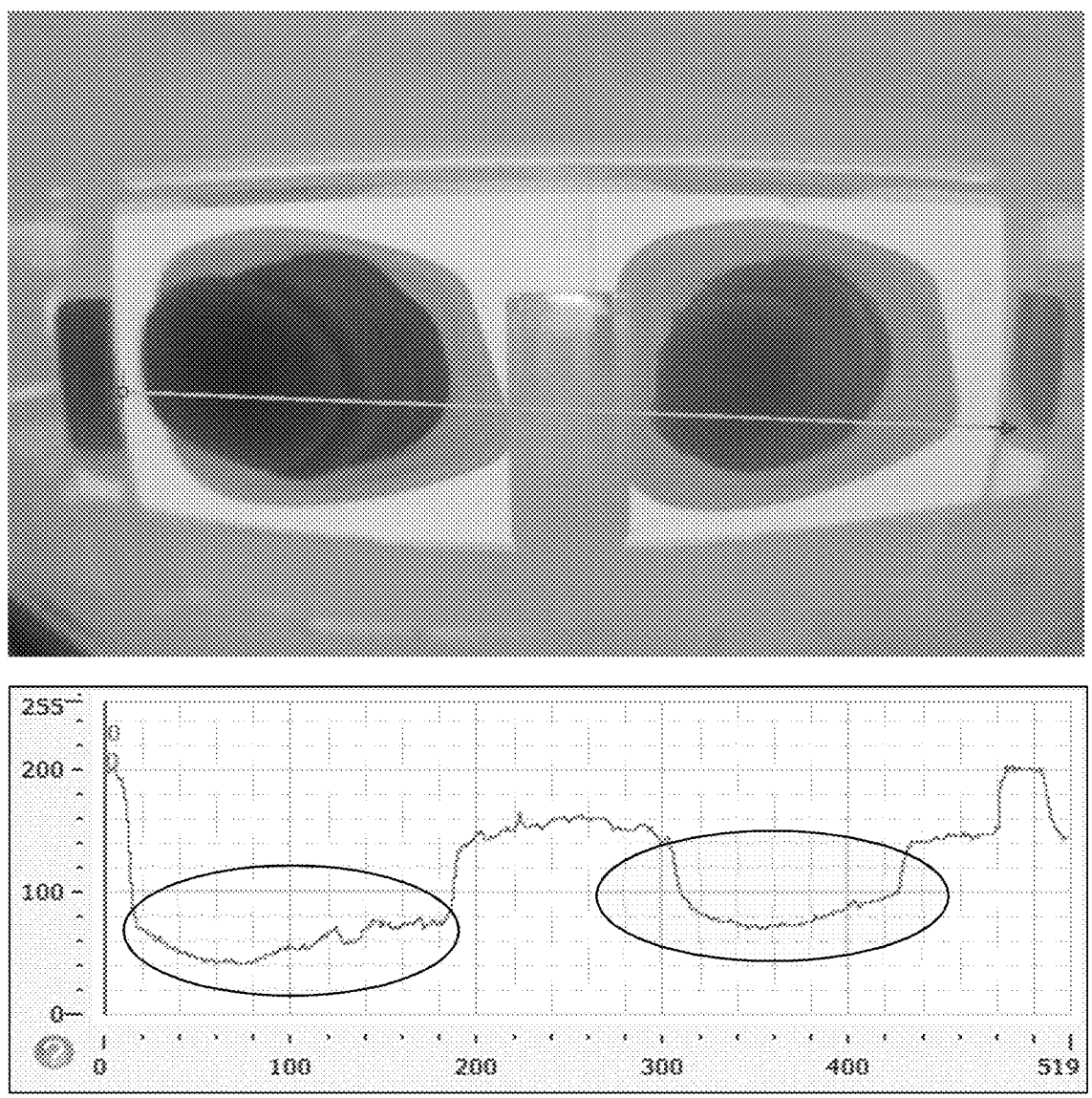
FIG. 8A shows a representative thermal image (upper panel) obtained prior to sealing of a container (black pixels representing cold objects and white pixels representing hot objects) and a graph (lower panel) showing the change in pixel intensity in the image.
Figure 8B:
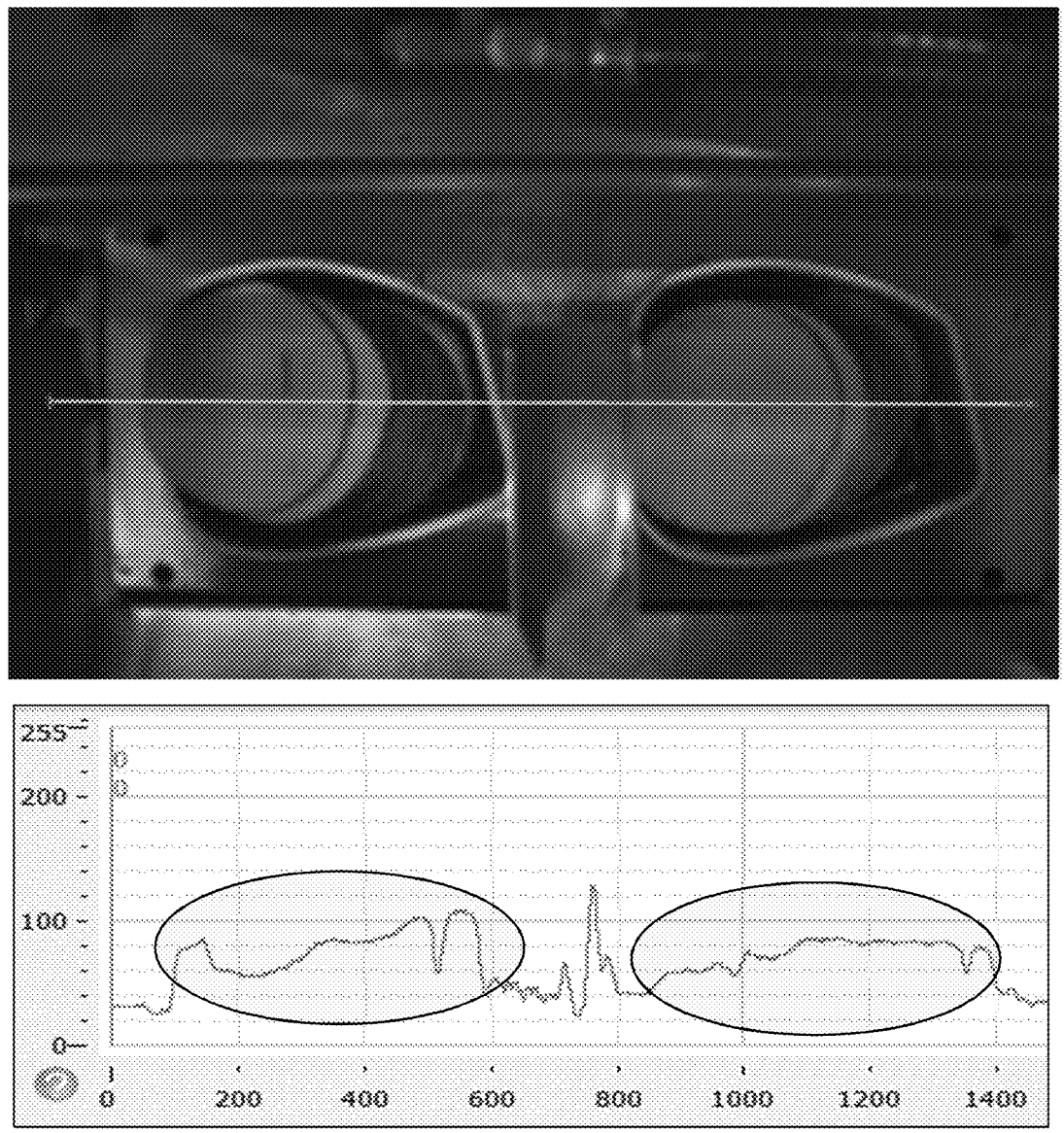
FIG. 8B shows a representative visual image (upper panel) obtained prior to sealing of a container (red channel) and a graph (lower panel) showing the change in pixel intensity in the image.

Lunch meat packaging was evaluated using the hereindisclosed system for pre-sealing thermographic imaging (thermal imaging) using a thermal imaging IR camera. The setup of the system before and after sealing of the container is shown in FIG. 7A and FIG. 7B, respectfully. camera 710 was positioned at the filling station so as to image container 720 before (as shown in FIG. 7A) and during sealing of container 720, (as shown in FIG. 7B). In particular, the camera was configured to identify contamination of the container's sealing region 722 with lunch meat 730 before and during sealing of container 720 with seal 724. The imaging was performed either using either a camera configured for visual spectrum imaging (here an industrial SONY 4 Mega pixel color camera) or a thermal camera configured for LWIR imaging (here a FLIR 640×512 pixels uncooled bolometer). The obtained images were sent to a processor configured to retrieve one or more image frames and to process the images to identify contaminations using suitable machine learning algorithms for image processing, as essentially disclosed herein. As shown in FIG. 8A, the hereindisclosed thermal image system enabled clear distinction between container 720 and content (here lunch meat 730), this due to the temperature difference between the cold lunch meat (about 0-4° C.) as opposed to the room temperature (about 10-15° C.), thus ensuring a strong contrast for the thermal imaging. This enabled clear and certain identification of contaminations of sealing region 722. Visual imaging (FIG. 8B), on the other hand, provided a much more blurred image, making it difficult to distinguish between container 720 and lunch meat 730.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" or "comprising", when used in this specification, specify the presence of stated features, integers, steps, operations, elements, or components, but do not preclude or rule out the presence or addition of one or more other features, integers, steps, operations, elements, components, or groups thereof.

Unless specifically stated otherwise, as apparent from the following discussions, it is appreciated that throughout the specification discussions utilizing terms such as "processing", "computing", "calculating", "determining", "estimating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

While a number of exemplary aspects and embodiments have been discussed above, those of skill in the art will recognize certain modifications, additions and subcombinations thereof. It is therefore intended that the following appended claims and claims hereafter introduced be interpreted to include all such modifications, additions, and sub-combinations as are within their true spirit and scope.

The invention claimed is:

1. A method for improving packaging line sealing performance, the method comprising:
   obtaining a plurality of images of at least a part of a sealing region of containers sealed at the packaging line, wherein the imagining is performed using at least one imaging camera operative at a wavelength in the range of 0.9 µm-14 µm; and
   obtaining and/or determining at least one packaging line parameter,
   applying big data analysis on the plurality of images and on the at least one packaging line parameter,
   computing a trend in the sealing performance of the packaging line based on the analysis, and
   providing an indication regarding a detected and/or predicted sealing process deficiency when the trend is indicative of a decline in the sealing performance of the packaging line.

2. The method of claim 1, wherein the at least one packaging line parameters comprise one or more sealing quality parameters and/or one or more sealing efficiency parameters.

3. The method of claim 2, wherein computing the trend further comprises differentiating between sealing quality and sealing efficiency.

4. The method according to claim 2, wherein the one or more sealing quality parameters is selected from sealing temperature, sealing pressure, sealing time, laminate, supplier pressure applied on cutting jaws, customer complaints, flow of filling product, product weight, nozzle position, heat of filing material, viscosity of filling material or any combination thereof.

5. The method according to claim 2, wherein the one or more sealing efficiency parameters is selected from time between sealer cleanups, duration of cleanups, statistics of Teflon replacements on sealing bars, time between packaging line stops, duration of the stops, number of sealed products per minute, speed of packing line, or any combination thereof.

6. The method according to claim 1, further comprising extracting one or more sealing features from the plurality of images, wherein the sealing features are selected from sealing area, sealing length, sealing width, sealing disconnection, sealing uniformity, alignment, thermal radiation or any combination thereof, and wherein the big data analysis is further applied on the one or more sealing features.

7. The method of claim 1, further comprising issuing an alert if the computed trend is indicative of a detected or predicted sealing inefficiency.

8. The method of claim 7, further comprising conducting a follow up inspection, wherein the follow up comprises taking into account actions taken to overcome the detected or predicted sealing inefficiency.

9. The method of claim 1, further comprising obtaining a plurality of images captured during filling of the plurality of containers, obtaining and/or determining one or more filling parameters, applying big data filling analysis on the plurality of images captured during the filling and on the at least one filing parameter, and computing a trend in a filing performance of the packaging line, based on the filling analysis.

10. The method according to claim 1, wherein the container is selected from the group consisting of: a canister; a blister package, a tube, a heat seal bag, pouch, sachet, bottle, or any combination thereof.

11. The method according to claim 1, wherein the filling material is selected from the group consisting of: a liquid, a paste, a cream, a foam, or any combination thereof.

12. The method according to claim 1, wherein the filling material is a food stuff.

13. The method according to claim 1, wherein the sealing comprises heat sealing.

14. A packaging system comprising:
   a package line comprising at least a filling station for filling a container with a filling material and a sealing station for sealing of the container; and an imaging camera operative at a wavelength in the range of 0.01 µm-14 µm, the imaging camera positioned and configured to enable imaging of at least part of a sealing region of container processed on the packaging line; and a processor configured to
obtain a plurality of images of at least a part of a sealing region of the containers processed on the packaging line, wherein the imagining is performed using at least one imaging camera operative at a wavelength in the range of 0.9 μm-14 μm; and
obtain and/or determine at least one packaging line parameter,
apply big data analysis on the plurality of images and on the at least one packaging line parameter,
compute a trend in the sealing performance of the packaging line based on the analysis, and
provide an indication regarding a detected and/or predicted sealing process deficiency when the trend is indicative of a decline in the sealing performance.

15. The system according to claim 14, wherein the at least one packaging line parameters comprise one or more sealing quality parameters and/or one or more sealing efficiency parameters.

16. The system according to claim 15, wherein computing the trend further comprises differentiating between sealing quality and sealing efficiency.

17. The system according to claim 15, wherein the one or more sealing quality parameters is selected from sealing temperature, sealing pressure, sealing time, laminate, supplier pressure applied on cutting jaws, customer complaints, flow of filling product, product weight, nozzle position, heat of filing material, viscosity of filling material or any combination thereof.

18. The system according to claim 15, wherein the one or more sealing efficiency parameters is selected from time between sealer cleanups, duration of cleanups, statistics of Teflon replacements on sealing bars, time between packaging line stops, duration of the stops, number of sealed products per minute, speed of packing line, or any combination thereof.

19. The system according to claim 14, wherein the processor is further configured to extract one or more sealing features from the plurality of images, wherein the sealing parameters are selected from sealing area, sealing length, sealing width, sealing disconnection, sealing uniformity, alignment, thermal radiation or any combination thereof, and wherein the big data analysis is further applied on the one or more sealing parameters.

20. The system of claim 14, wherein the processor is further configured to obtain a plurality of images captured during filling of the plurality of containers, obtain and/or determine one or more filling parameters, apply big data filling analysis on the plurality of images captured during the filling and on the at least one filing parameter, and computing a trend in a filing performance of the packaging line, based on the filling analysis.

* * * * *